US006936323B2

(12) United States Patent
Noguchi et al.

(10) Patent No.: US 6,936,323 B2
(45) Date of Patent: Aug. 30, 2005

(54) OPTICAL RECORDING MEDIUM, AND METHOD AND DEVICE USING THE SAME

(75) Inventors: Soh Noguchi, Kanagawa (JP); Tsutomu Sato, Kanagawa (JP); Tatsuya Tomura, Tokyo (JP); Yasunobu Ueno, Kanagawa (JP); Ikuo Shimizu, Mie (JP); Motoharu Kinugasa, Mie (JP); Hiroshi Toyoda, Mie (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/836,854

(22) Filed: Apr. 30, 2004

(65) Prior Publication Data

US 2004/0265645 A1 Dec. 30, 2004

(30) Foreign Application Priority Data

Apr. 30, 2003 (JP) ...................................... 2003-125849

(51) Int. Cl.[7] .................................................. B32B 3/02

(52) U.S. Cl. .................... 428/64.1; 428/64.4; 428/64.8; 430/270.14; 430/270.16

(58) Field of Search ............................... 428/64.1, 64.4, 428/64.8; 430/270.14, 270.16; 369/288

(56) References Cited

U.S. PATENT DOCUMENTS

| | | | |
|---|---|---|---|
| 4,626,496 | A | 12/1986 | Sato |
| 4,656,121 | A | 4/1987 | Sato et al. |
| 4,696,892 | A | 9/1987 | Abe et al. |
| 4,714,667 | A | 12/1987 | Sato et al. |
| 4,735,839 | A | 4/1988 | Sato et al. |
| 4,737,444 | A | 4/1988 | Satoh et al. |
| 4,758,499 | A | 7/1988 | Abe et al. |
| 5,002,812 | A | 3/1991 | Umehara et al. |

(Continued)

FOREIGN PATENT DOCUMENTS

| | | |
|---|---|---|
| JP | 57-82093 | 5/1982 |
| JP | 58-56892 | 4/1983 |
| JP | 58-112790 | 7/1983 |
| JP | 58-114989 | 7/1983 |
| JP | 59-85791 | 5/1984 |

(Continued)

OTHER PUBLICATIONS

"Development of DVD–Recordable", (1996) Pioneer R&D, vol. 6, No. 2, pp. 79–84.

"Fundamental Development of DVD–R", (1996) Pioneer R&D, vol. 6, No. 2, pp. 85–89.

Emiko Hamada et al., (1996) "High density optical recording on Dye material Disc Approach for 4.7GB", International Symposium on Optical Memory and Optical Data Storage 1996, pp. OPdP2–2–OPdP2–4.

U.S. Appl. No. 09/609,419 of Tsutomu Satoh et al., filed Jul. 5, 2000.

U.S. Appl. No. 09/925,425 of Tatsuya Tomura et al., filed Aug. 9, 2001.

U.S. Appl. No. 10/166,742 of Soh Noguchi et al., filed Jun. 11, 2002.

U.S. Appl. No. 10/280,954 of Tohru Yashiro et al., filed Oct. 24, 2002.

U.S. Appl. No. 10/357,813 of Soh Noguchi et al., filed Feb. 4, 2003.

*Primary Examiner*—Elizabeth Mulvaney
(74) *Attorney, Agent, or Firm*—Cooper & Dunham LLP

(57) ABSTRACT

An optical recording medium includes a substrate and at least a recording layer deposited on or above the substrate, and the recording layer contains at least one formazan-metal chelate compound containing a formazan compound and a metal component; at least one squarylium-metal chelate compound containing a squarylium compound and a metal component; and at least one diarylamine compound.

19 Claims, 4 Drawing Sheets

U.S. PATENT DOCUMENTS

| | | | | | |
|---|---|---|---|---|---|
| 5,028,467 | A | | 7/1991 | Maruyama et al. | |
| 5,085,909 | A | | 2/1992 | Satoh et al. | |
| 5,137,798 | A | | 8/1992 | Duggan et al. | |
| 5,149,819 | A | | 9/1992 | Satoh et al. | |
| 5,256,794 | A | | 10/1993 | Satoh et al. | |
| 5,260,165 | A | | 11/1993 | Satou et al. | |
| 5,391,741 | A | | 2/1995 | Shimizu et al. | |
| 5,677,025 | A | | 10/1997 | Tomura et al. | |
| 5,863,703 | A | | 1/1999 | Tomura et al. | |
| 5,939,163 | A | | 8/1999 | Ueno et al. | |
| 5,998,093 | A | | 12/1999 | Tomura et al. | |
| 6,057,020 | A | | 5/2000 | Ueno et al. | |
| 6,168,843 | B1 | | 1/2001 | Kambe et al. | |
| 6,197,477 | B1 | | 3/2001 | Satoh et al. | |
| 6,225,022 | B1 | | 5/2001 | Tomura et al. | |
| 6,383,596 | B1 | * | 5/2002 | Arioka et al. .............. | 428/64.1 |
| 6,558,768 | B2 | | 5/2003 | Noguchi et al. | |
| 6,596,364 | B2 | | 7/2003 | Shimizu et al. | |
| 6,599,605 | B2 | | 7/2003 | Shimizu et al. | |
| 6,628,595 | B1 | | 9/2003 | Sasa et al. | |
| 6,645,594 | B1 | * | 11/2003 | Yano et al. ................ | 428/64.1 |
| 6,660,867 | B2 | | 12/2003 | Shimizu et al. | |
| 6,794,005 | B2 | * | 9/2004 | Noguchi et al. ........... | 428/64.1 |
| 2003/0157291 | A1 | * | 8/2003 | Noguchi et al. ........... | 428/64.4 |
| 2004/0202098 | A1 | * | 10/2004 | Yashiro et al. ............. | 369/288 |

FOREIGN PATENT DOCUMENTS

| | | |
|---|---|---|
| JP | 60-83236 | 5/1985 |
| JP | 60-89842 | 5/1985 |
| JP | 61-25886 | 2/1986 |
| JP | 61-154888 | 7/1986 |
| JP | 61-177287 | 8/1986 |
| JP | 61-246091 | 11/1986 |
| JP | 62-39286 | 2/1987 |
| JP | 63-37991 | 2/1988 |
| JP | 1-159842 | 6/1989 |
| JP | 1-175585 | 7/1989 |
| JP | 1-176585 | 7/1989 |
| JP | 2-42652 | 2/1990 |
| JP | 2-168446 | 6/1990 |
| JP | 3-215466 | 9/1991 |
| JP | 4-46186 | 2/1992 |
| JP | 4-113886 | 4/1992 |
| JP | 4-141489 | 5/1992 |
| JP | 4-226390 | 8/1992 |
| JP | 4-361088 | 12/1992 |
| JP | 5-1272 | 1/1993 |
| JP | 5-96860 | 4/1993 |
| JP | 5-116456 | 5/1993 |
| JP | 5-139044 | 6/1993 |
| JP | 5-171052 | 7/1993 |
| JP | 5-67438 | 9/1993 |
| JP | 5-279580 | 10/1993 |
| JP | 7-37272 | 2/1995 |
| JP | 7-372272 | 2/1995 |
| JP | 7-161069 | 6/1995 |
| JP | 8-156408 | 6/1996 |
| JP | 8-198872 | 8/1996 |
| JP | 8-209012 | 8/1996 |
| JP | 8-231866 | 9/1996 |
| JP | 8-283263 | 10/1996 |
| JP | 8-295811 | 11/1996 |
| JP | 8-332772 | 12/1996 |
| JP | 9-58123 | 3/1997 |
| JP | 9-95520 | 4/1997 |
| JP | 9-175031 | 7/1997 |
| JP | 9-193545 | 7/1997 |
| JP | 9-193546 | 7/1997 |
| JP | 9-274732 | 10/1997 |
| JP | 9-277703 | 10/1997 |
| JP | 10-6644 | 1/1998 |
| JP | 10-6650 | 1/1998 |
| JP | 10-6651 | 1/1998 |
| JP | 10-36693 | 2/1998 |
| JP | 1044606 | 2/1998 |
| JP | 10-58828 | 3/1998 |
| JP | 10-86517 | 4/1998 |
| JP | 10-86519 | 4/1998 |
| JP | 2791944 | 6/1998 |
| JP | 10-149584 | 6/1998 |
| JP | 10-151854 | 6/1998 |
| JP | 10-151862 | 6/1998 |
| JP | 10-151863 | 6/1998 |
| JP | 10-152623 | 6/1998 |
| JP | 10-154350 | 6/1998 |
| JP | 10-157293 | 6/1998 |
| JP | 10-157300 | 6/1998 |
| JP | 10-157301 | 6/1998 |
| JP | 10-157302 | 6/1998 |
| JP | 10-181199 | 7/1998 |
| JP | 10-181201 | 7/1998 |
| JP | 10-181203 | 7/1998 |
| JP | 10-181206 | 7/1998 |
| JP | 10-188338 | 7/1998 |
| JP | 10-188340 | 7/1998 |
| JP | 10-188341 | 7/1998 |
| JP | 10-188358 | 7/1998 |
| JP | 10-208303 | 8/1998 |
| JP | 10-214423 | 8/1998 |
| JP | 10-226172 | 8/1998 |
| JP | 10-228671 | 8/1998 |
| JP | 10-235999 | 9/1998 |
| JP | 10-244752 | 9/1998 |
| JP | 10-273484 | 10/1998 |
| JP | 10-287819 | 10/1998 |
| JP | 10-297103 | 11/1998 |
| JP | 10-309871 | 11/1998 |
| JP | 10-309872 | 11/1998 |
| JP | 10-337958 | 12/1998 |
| JP | 11-12483 | 1/1999 |
| JP | 11-28865 | 2/1999 |
| JP | 11-34489 | 2/1999 |
| JP | 11-34499 | 2/1999 |
| JP | 11-42858 | 2/1999 |
| JP | 11-99746 | 4/1999 |
| JP | 11-99747 | 4/1999 |
| JP | 11-138999 | 5/1999 |
| JP | 11-144313 | 5/1999 |
| JP | 11-151861 | 6/1999 |
| JP | 11-165466 | 6/1999 |
| JP | 11-195242 | 7/1999 |
| JP | 11-208111 | 8/1999 |
| JP | 11-250505 | 9/1999 |
| JP | 2000-168237 | 6/2000 |
| JP | 2000-190641 | 7/2000 |
| JP | 2000190642 | 7/2000 |
| JP | 2000-198273 | 7/2000 |
| JP | 2000-318311 | 11/2000 |
| JP | 2001-67732 | 3/2001 |
| JP | 2001-80211 | 3/2001 |
| JP | 2001-322356 | 11/2001 |
| JP | 2002-370451 | 12/2002 |
| WO | WO 98/29257 | 7/1998 |

* cited by examiner

OPTICAL RECORDING MEDIUM, AND METHOD AND DEVICE USING THE SAME

BACKGROUND OF THE INVENTION

1. Field of the Invention

The present invention relates to an optical recording medium, as well as an optical recording method and an optical recording device using the optical recording medium.

2. Description of the Related Art

Recordable DVD media have been developed as next-generation optical disks with large capacities. The possibilities of increasing the recording capacity of the DVD media are in the development of a recording material that can minimize a recording pit to be formed, introduction of image compression technologies such as Moving Picture Experts Group-2 (MPEG 2), and improvement in the method of shortening the wavelength of the semiconductor laser used to read the recording pit.

An AlGaInP semiconductor laser with a wavelength of 670 nm is only one red semiconductor laser that has been developed and commercialized for a bar code reader and a measuring instrument. Along with the development of the optical discs with a high recording density, the red semiconductor laser has been introduced and used in practice in the optical recording industry. For a driving system for a digital versatile disc (DVD), semiconductor lasers with wavelengths from 630 to 690 nm are standardized as the light sources. A reproduction-only DVD-ROM drive equipped with a light source with a wavelength of 650 nm or less is now commercially available.

Under these circumstances, most preferred recordable DVD media are media on which information can be recorded and read at a wavelength of 630 nm to 690 nm. Various dye materials such as cyanine dyes, azo dyes, azomethine dyes, styryl dyes, formazan dyes and squarylium dyes have been proposed for use in the recording layer. Examples of these proposals are shown below.

a) Conventional Technologies on Write-once-read-many (WORM) Media

Those using a cyanine dye as a recording material: Japanese Patent Application Laid-Open (JP-A) No. 57-82093, No. 58-56892, No. 58-112790, No. 58-114989, No. 59-85791, No. 60-83236, No. 60-89842 and No. 61-25886

Those using a phthalocyanine dye as a recording material: JP-A No. 61-177287, No. 61-154888, No. 61-246091, No. 62-39286 and No. 63-37991 b) Conventional Technologies on Recordable Compact Disks (CD-Rs)

Those using a cyanine dye and a metal reflective layer as recording materials: JP-A No. 01-159842, No. 02-42652 and No. 02-168446

Those using a phthalocyanine dye and a metal reflective layer as recording materials: JP-A No. 01-176585, No. 03-215466, No. 04-113886, No. 04-226390, No. 05-1272, No. 05-171052, No. 05-116456, No. 05-96860 and No. 05-139044

Those using an azo-metal chelate dye and a metal reflective layer as recording materials: JP-A No. 04-46186, No. 04-141489, No. 04-361088, No. 05-279580, No. 07-161069, No. 07-37272, No. 08-231866 and No. 08-295811 c) Conventional Technologies on Large-capacity Recordable Digital Versatile Disks (DVD-R)

Those using a cyanine dye and a metal reflective layer as recording materials: "Development of DVD-Recordable" and "Fundamental Development of DVD-R", PIONEER R&D vol. 6, No. 2, 1996; "High Density of Recording on Dye Material Disc Approach for 4.7G", International Symposium on Optical Memory and Optical Data Storage 1996 (ISOM/ODS '96), 1996; and JP-A No. 10-235999

Those using an azomethine dye and a metal reflective layer as recording materials: JP-A No. 08-198872, No. 08-209012, No. 08-283263 and No. 10-273484

Those using an azo-metal chelate dye and a metal reflective layer as recording materials: Japanese Patent Application Publication (JP-B) No. 05-67438; JP-A No. 07-161069, No. 08-156408, No. 08-231866, No. 08-332772, No. 09-58123, No. 09-175031, No. 09-193545, No. 09-274732, No. 09-277703, No. 10-6644, No. 10-6650, No. 10-6651, No. 10-36693, No. 10-44606, No. 10-58828, No. 10-86519, No. 10-149584, No. 10-157293, No. 10-157300, No. 10-157301, No. 10-157302, No. 10-181199, No. 10-181201, No. 10-181203, No. 10-181206, No. 10-188340, No. 10-188341, No. 10-188358, No. 10-208303, No. 10-214423, No. 10-228671, No. 10-36693, No. 11-12483, No. 11-28865, No. 11-42858, No. 11-138999, No. 11-151861, No. 11-208111, No. 2000-318311 and No. 2001-80211

Those using a styryl dye and a metal reflective layer as recording materials: JP-A No. 10-151854, No. 10-188338, No. 11-34489, No. 11-99746, No. 11-99747, No. 11-144313 and No. 11-165466

Those using a formazan dye and a metal reflective layer as recording materials: Japanese Patent (JP-B) No. 2791944; JP-A No. 08-295079, No. 09-095520, No. 09-193546, No. 10-151862, No. 10-151863, No. 10-152623, No. 10-154350 and No. 10-337958

Those using a squarylium dye and a metal reflective layer as recording materials: JP-A No. 2001-322356

Those using a formazan-metal chelate compound, a squarylium-metal chelate compound and a metal reflective layer as recording materials: JP-A No. 2002-370451

Those using another dye and a metal reflective layer as recording materials: JP-A No. 10-86517, No. 10-226172, No. 10-244752, No. 10-287819, No. 10-297103, No. 10-309871, No. 10-309872

Those using an azo-metal chelate anionic dye and a cyanine cationic dye as recording materials: International Publication No. WO 98/29257; JP-A No. 11-34499, No. 11-195242, No. 11-250505, No. 2000-168237, No. 2000-190641, No. 2000-190642, No. 2000-198273 and No. 2001-67732

However, these materials have varying properties largely depending on wavelengths, since the resulting dye media are designed so as to have a recording-reading wavelength at a longer-wavelength-side end of an absorption band of the dye film to thereby yield their high reflectance (FIG. 1). Semiconductor laser for use in recording DVD drives has a varying oscillation wavelength depending on operating conditions. In particular, the oscillation wavelength shifts to a longer wavelength at high temperatures, thus inviting a decreased extinction coefficient "k" of the dye material used in the recording layer and leading to an insufficient recording sensitivity.

Objects and Advantages

Accordingly, an object of the present invention is to provide an optical recording medium that is applicable to recordable DVD systems using semiconductor laser having an oscillation wavelength shorter than those of conventional equivalents. Another object of the present invention is to provide such an optical recording medium having properties less dependent on a varying recording wavelength. Still another object of the present invention is to provide an optical recording method and device using the optical recording medium.

SUMMARY OF THE INVENTION

After intensive investigations, the present inventors have found that an optical recording medium having properties less dependent on the wavelength of semiconductor laser can be obtained by using a diarylamine compound having a specific structure and a maximum absorption in a range of a wavelength of 650 nm to 800 nm in combination with a dye mixture comprising a formazan-metal chelate compound and a squarylium-metal chelate compound and having a maximum absorption in a range of a wavelength of 500 nm to 650 nm. The dye mixture alone is generally used as a recording material in conventional recordable DVD media.

Specifically, the present invention provides, in a first aspect, an optical recording medium comprising a substrate and a recording layer deposited on or above the substrate, wherein the recording layer comprises at least one formazan-metal chelate compound comprising a formazan compound and a metal component; at least one squarylium-metal chelate compound comprising a squarylium compound and a metal component; and at least one diarylamine compound.

The formazan-metal chelate compound and the squarylium-metal chelate compound each preferably have a maximum absorption in a range of a wavelength of 500 nm to 650 nm in absorption spectrum in terms of their films, and the diarylamine compound preferably has a maximum absorption in a range of a wavelength of 650 nm to 800 nm in absorption spectrum in terms of its film.

The weight ratio of the formazan-metal chelate compound to the squarylium-metal chelate compound in the recording layer is preferably from 10:90 to 50:50.

The diarylamine compound may be contained in the recording layer in an amount of preferably 0.5% by weight to 20% by weight, and more preferably 1% by weight to 5% by weight, to the total weight of the formazan-metal chelate compound and the squarylium-metal chelate compound.

The formazan-metal chelate compound preferably comprises one of formazan compounds represented by the following Formula (I) or (II), and one metal component:

(I)

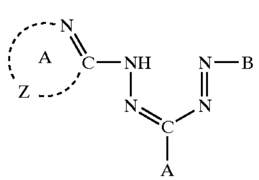

wherein "Ring A" is a substituted or unsubstituted nitrogen-containing five- or six-membered ring; "Z" is an atomic group constituting "Ring A," where "Ring A" may have another ring fused thereto; "A" is one selected from the group consisting of an alkyl group which may be substituted, an aryl group which may be substituted, an alkylcarbonyl group which may be substituted, an arylcarbonyl group which may be substituted, an alkenyl group which may be substituted, a heterocyclic group which may be substituted and an alkoxycarbonyl group which may be substituted; and "B" is one selected from the group consisting of an alkyl group which may be substituted, an alkenyl group which may be substituted and an aryl group which may be substituted;

(II)

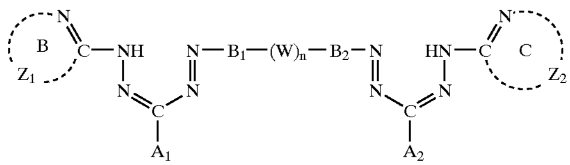

wherein "Ring B" and "Ring C" are the same or different and are independently a substituted or unsubstituted nitrogen-containing five- or six-membered ring; "$Z_1$" and "$Z_2$" are atomic groups constituting "Ring B" and "Ring C," respectively; each of "Ring B" and "Ring C" may have another ring fused thereto; "$A_1$" and "$A_2$" are independently one selected from the group consisting of an alkyl group which may be substituted, an aryl group which may be substituted, an alkylcarbonyl group which may be substituted, an arylcarbonyl group which may be substituted, an alkenyl group which may be substituted, a heterocyclic group which may be substituted and an alkoxycarbonyl group which may be substituted; "$B_1$" and "$B_2$" are independently one selected from the group consisting of an alkylene group which may be substituted, an alkenylene group which may be substituted and an arylene group which may be substituted; "W" is one of —$CH_2$— and —$SO_2$—; and "n" is an integer of 0 or 1.

The metal component of the formazan-metal chelate compound is preferably one selected from the group consisting of vanadium, manganese, iron, cobalt, nickel, copper, zinc, palladium, oxides thereof and halides thereof.

The squarylium-metal chelate compound is preferably a compound represented by following Formula (III):

(III)

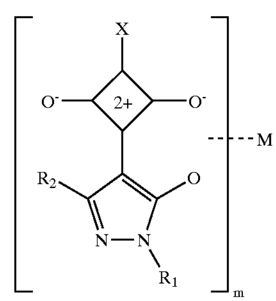

wherein "$R_1$" and "$R_2$" are the same or different and are independently one selected from the group consisting of hydrogen atom, an aliphatic group which may be substituted, an aralkyl group which may be substituted, an aryl group which may be substituted and a heterocyclic group which may be substituted; "M" is a metal atom capable of coordination; m is an integer of 2 or 3; and "X" is one selected from the group consisting of an aryl group which may be substituted, a heterocyclic group which may be substituted and $Z_3$=CH—, wherein "$Z_3$" is a heterocyclic group which may be substituted.

The substituent "X" in Formula (III) is preferably a group represented by following Formula (IV):

(IV)

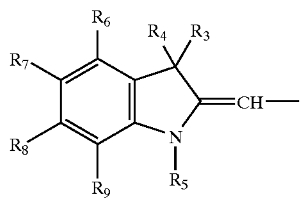

wherein "$R_3$" and "$R_4$" are the same or different and are independently an aliphatic group which may be substituted, or "$R_3$" and "$R_4$" are taken together with an adjacent carbon atom to form one of an alicyclic hydrocarbon ring and a heterocyclic ring; "$R_5$" is one selected from the group consisting of a hydrogen atom, an aliphatic group which may be substituted, an aralkyl group which may be substituted and an aryl group which may be substituted; and "$R_6$," "$R_7$," "$R_8$" and "$R_9$" are the same or different and are independently one selected from the group consisting of a hydrogen atom, a halogen atom, an aliphatic group which may be substituted, an aralkyl group which may be substituted, an aryl group which may be substituted, a nitro group, a cyano group and an alkoxy group which may be substituted, or adjacent two of "$R_6$," "$R_7$," "$R_8$" and "$R_9$" are taken together with two adjacent carbon atoms to form a ring which may be substituted.

The metal atom "M" in Formula (III) is preferably aluminum.

The diarylamine compound is preferably a compound represented by following Formula (V):

(V)

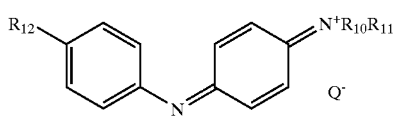

wherein "$R_{10}$" and "$R_{11}$" are the same or different and are independently one of a hydrogen atom and an alkyl group which may be substituted; "$R_{12}$" is one selected from the group consisting of a hydrogen atom, an alkyl group which may be substituted and an alkylamino group which may be substituted; and "Q-" is an anion.

The anion "Q-" is preferably one selected from the group consisting of I—, $ClO_4$—, $BF_4$—, $PF_6$— and $SbF_6$—.

In formula (V), it is preferred that "$R^{10}$" and "$R_{11}$" are independently an alkyl group having 1 to 15 carbon atoms; and "$R_{12}$" is one of an alkyl group having 1 to 15 carbon atoms and an alkylamino group containing an alkyl group having 1 to 15 carbon atoms.

The recording layer alone preferably has a refractive index "n" of 1.5 to 3.0 and an extinction coefficient "k" of 0.02 to 0.3 with respect to radiation at a wavelength of a recording-reading wavelength ±5 nm.

The medium may further comprise a reflective layer on or above the substrate, and the reflective layer may comprise at least one selected from the group consisting of gold, silver, copper, aluminum, and alloys thereof.

The substrate may have grooves at a track pitch of 0.7 μm to 0.8 μm and a groove width in terms of half width of 0.18 μm to 0.40 μm.

On the optical recording medium, information may be recorded using radiation at a wavelength of 600 nm to 720 nm.

The present invention further provides, in a second aspect, an optical recording method, comprising the step of recording information on the aforementioned optical recording medium using radiation at a wavelength of 600 nm to 720 nm.

In addition and advantageously, the present invention provides an optical recording device having the aforementioned optical recording medium.

Further objects, features and advantages of the present invention will become apparent from the following description of the preferred embodiments with reference to the attached drawings.

DESCRIPTION OF THE PREFERRED EMBODIMENTS

Figure 1:
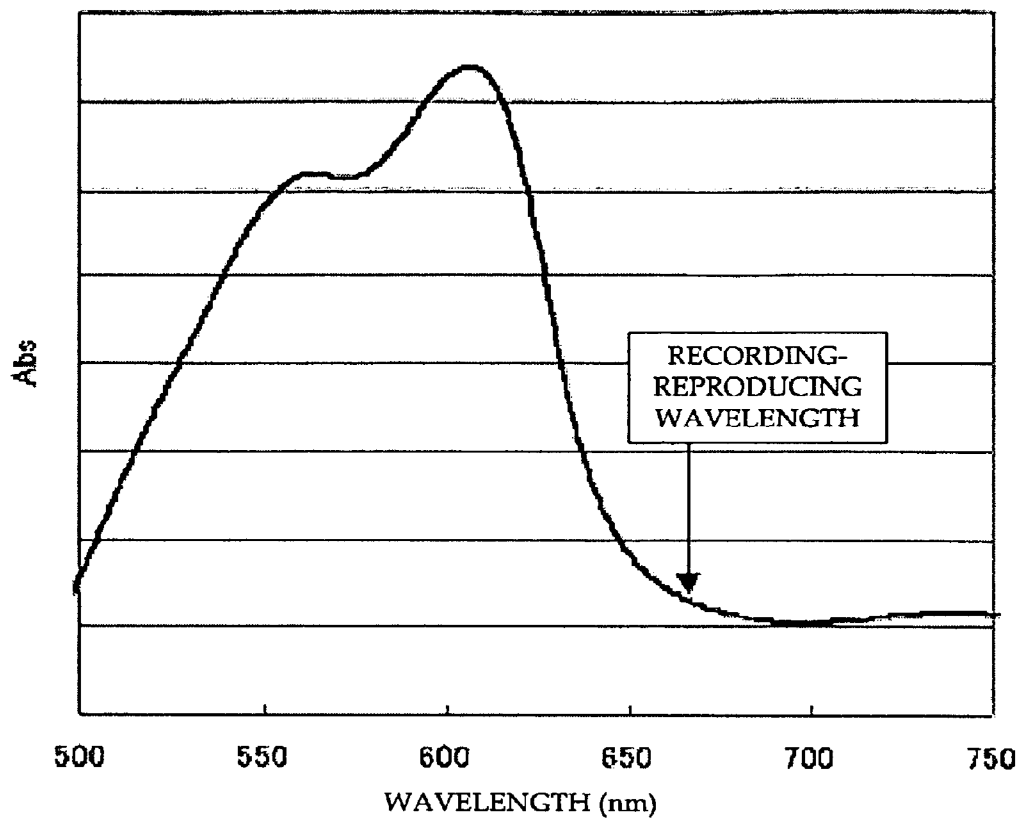
FIG. 1 shows a relationship between a recording-reading wavelength and an absorption spectrum of a dye mixture for use in a recording layer.
Figure 2A:
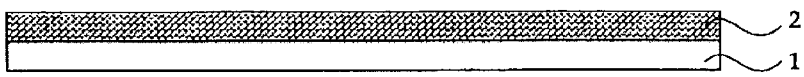
FIGS. 2A, 2B, 2C and 2D are each a schematic diagram of a regular recordable optical recording medium.
Figure 2B:
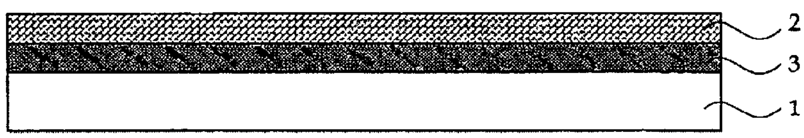
Figure 2C:
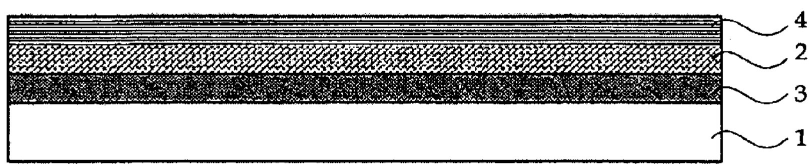
Figure 2D:
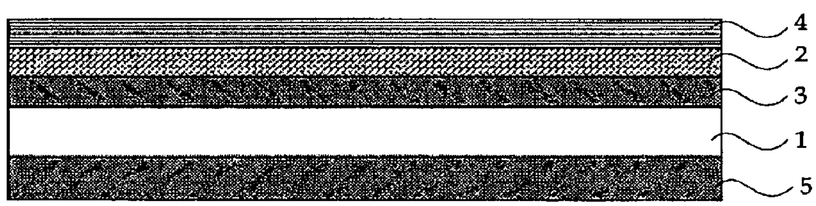

The optical recording medium of the present invention comprises in its recording layer (i) a formazan-metal chelate compound comprising a formazan compound and a metal component, (ii) a squarylium-metal chelate compound comprising a squarylium compound and a metal component, and (iii) a diarylamine compound. Examples of the formazan compound include conventional formazan compounds, of which at least one of compounds represented by following Formulae (I) and (II) is preferred.

(I)

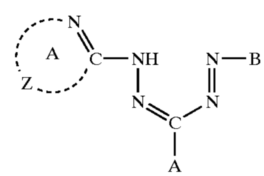

(II)

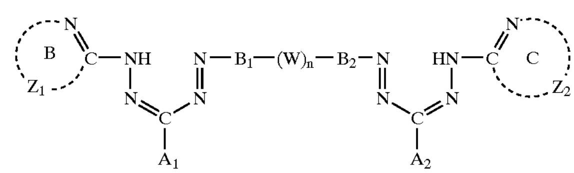

In Formulae (I) and (II), "Ring A," "Ring B" and "Ring C" are independently a substituted or unsubstituted nitrogen-containing five- or six-membered ring; "Z," "$Z_1$" and "$Z_2$" are atomic groups constituting "Ring A," "Ring B" and "Ring C," respectively. Such atomic groups may further comprise one or more hetero atoms, in addition to carbon atoms. Examples of the hetero atom are nitrogen atom (N), sulfur atom (S), oxygen atom (O) and selenium atom (Se).

Each of "Ring A," "Ring B" and "Ring C" may have another "Ring D." "Ring D" may be a hydrocarbon ring or a heterocycle. In the case of a hydrocarbon ring, "Ring D" preferably has 6 to 20 carbon atoms and more preferably 6 to 10 carbon atoms. Specific examples thereof are benzene ring, naphthalene ring and cyclohexane ring. In the case of a heterocycle, "Ring D" preferably has 5 to 20 members ring and more preferably 5 to 14 members ring. Specific examples thereof are pyrrolidine ring, thiazole ring, imidazole ring, oxazole ring, pyrazole ring, pyridine ring, pyridazine ring, pyrimidine ring, pyrazine ring, quinoline ring, indoline ring and carbazole ring.

Specific examples of "Ring A," "Ring B" and "Ring C" are thiazole ring, imidazole ring, thiadiazole ring, oxazole ring, triazole ring, pyrazole ring, oxadiazole ring, pyridine ring, pyridazine ring, pyrimidine ring, pyrazine ring and triazine ring.

Examples of the substituents which "Ring A," "Ring B" and "Ring C" may respectively have are a halogen atom, nitro group, cyano group, hydroxyl group, carboxyl group, amino group, carbamoyl group, an alkyl group which may be substituted, an aryl group which may be substituted, a heterocyclic group which may be substituted, an alkoxy group which may be substituted, an aryloxy group which may be substituted, an alkylthio group which may be substituted, an arylthio group which may be substituted, an alkylamino group which may be substituted, an arylamino group which may be substituted, an alkoxycarbonyl group which may be substituted, an aryloxycarbonyl group which may be substituted, an alkylcarboxamido group which may be substituted, an arylcarboxamido group which may be substituted, an alkylcarbamoyl group which may be substituted, an arylcarbamoyl group which may be substituted, an alkenyl group which may be substituted, and an alkylsulfamoyl group which may be substituted.

In Formulae (I) and (II), "A," "$A_1$" and "$A_2$" are independently one selected from an alkyl group which may be substituted, an aryl group which may be substituted, an alkylcarbonyl group which may be substituted, an arylcarbonyl group which may be substituted, an alkenyl group which may be substituted, a heterocyclic residue which may be substituted and an alkoxycarbonyl group which may be substituted. The alkyl group and alkenyl group may be chain-like or cyclic. The alkyl group preferably has 1 to 15 carbon atoms and more preferably 1 to 8 carbon atoms. The alkenyl group preferably has 2 to 8 carbon atoms and more preferably 2 to 6 carbon atoms.

In Formula (I), "B" is one selected from an alkyl group which may be substituted, an alkenyl group which may be substituted and an aryl group which may be substituted. The alkyl group and alkenyl group may be chain-like or cyclic. The alkyl group preferably has 1 to 15 carbon atoms and more preferably 1 to 8 carbon atoms. The alkenyl group preferably has 2 to 8 carbon atoms and more preferably 2 to 6 carbon atoms. The aryl group preferably has 6 to 18 carbon atoms and more preferably 6 to 14 carbon atoms.

In Formula (II), "$B_1$" and "$B_2$" are independently one selected from an alkylene group which may be substituted, an alkenylene group which may be substituted and an arylene group which may be substituted. The alkylene group and alkenylene group may be chain-like or cyclic. The alkylene group preferably has 1 to 15 carbon atoms and more preferably 1 to 8 carbon atoms. The alkenylene group preferably has 2 to 8 carbon atoms and more preferably 2 to 6 carbon atoms. The arylene group preferably has 6 to 18 carbon atoms and more preferably 6 to 14 carbon atoms.

Preferred examples of the alkyl groups are alkyl groups each having 1 to 15 carbon atoms, such as methyl group, ethyl group, n-propyl group, n-butyl group, n-pentyl group, n-hexyl group, n-heptyl group, n-octyl group, n-nonyl group or n-decyl group; a branched alkyl group such as isobutyl group, isoamyl group, 2-methylbutyl group, 2-methylpentyl group, 3-methylpentyl group, 4-methylpentyl group, 2-ethylbutyl group, 2-methylhexyl group, 3-methylhexyl group, 4-methylhexyl group, 5-methylhexyl group, 2-ethylpentyl group, 3-ethylpentyl group, 2-methylheptyl group, 3-methylheptyl group, 4-methylheptyl group, 5-methylheptyl group, 2-ethylhexyl group, 3-ethylhexyl group, isopropyl group, sec-butyl group, 1-ethylpropyl group, 1-methylbutyl group, 1,2-dimethylpropyl group, 1-methylheptyl group, 1-ethylbutyl group, 1,3-dimethylbutyl group, 1,2-dimethylbutyl group, 1-ethyl-2-methylpropyl group, 1-methylhexyl group, 1-ethylheptyl group, 1-propylbutyl group, 1-isopropyl-2-methylpropyl group, 1-ethyl-2-methylbutyl group, 1-propyl-2-methylpropyl group, 1-methylheptyl group, 1-ethylhexyl group, 1-propylpentyl group, 1-isopropylpentyl group, 1-isopropyl-2-methylbutyl group, 1-isopropyl-3-methylbutyl group, 1-methyloctyl group, 1-ethylheptyl group, 1-propylhexyl group, 1-isobutyl-3-methylbutyl group, neopentyl group, tert-butyl group, tert-hexyl group, tert-amyl group or tert-octyl group; a cylcoalkyl group such as cyclohexyl group, 4-methylcyclohexyl group, 4-ethylcyclohexyl group, 4-tert-butylcyclohexyl group, 4-(2-ethylhexyl)cyclohexyl group, bornyl group, isobornyl group or adamantyl group. Among them, alkyl groups each having 1 to 8 carbon atoms are more preferred.

The alkyl groups may be substituted with one or more substituents such as hydroxyl group, a halogen atom, nitro group, carboxyl group and cyano group. Alternatively or in addition, the alkyl groups may be substituted with an aryl group and/or a heterocyclic group which may be substituted with one or more specific substituents such as a halogen atom or nitro group. They may be substituted with one or more of the hydrocarbon groups such as alkyl groups with the interposition of one or more hetero atoms such as oxygen, sulfur and nitrogen atoms.

Examples of the alkyl group substituted with another hydrocarbon group with the interposition of oxygen are alkyl groups each substituted with one or more alkoxy groups and/or aryloxy groups, such as methoxymethyl group, ethoxymethyl group, ethoxyethyl group, butoxyethyl group, ethoxyethoxyethyl group, phenoxyethyl group, methoxypropyl group, ethoxypropyl group. These alkoxy groups and aryloxy groups may further be substituted.

Examples of the alkyl group substituted with another hydrocarbon group with the interposition of sulfur are alkyl groups each substituted with one or more alkylthio groups and/or arylthio groups, such as methylthioethyl group, ethylthioethyl group, ethylthiopropyl group, and phenylthioethyl group. These alkylthio groups and arylthio groups may further be substituted.

Examples of the alkyl group substituted with another hydrocarbon group with the interposition of nitrogen are alkyl groups each substituted with one or more alkylamino groups and/or arylamino groups, such as dimethylaminoethyl group, diethylaminoethyl group, diethylaminopropyl group, and phenylaminomethyl group. These alkylamino groups and arylamino groups may further be substituted.

Preferred examples of the alkenyl group are alkenyl groups each having 2 to 8 carbon atoms, such as vinyl group, allyl group, 1-propenyl group, methacryl group, crotyl group, 1-butenyl group, 3-butenyl group, 2-pentenyl group, 4-pentenyl group, 2-hexenyl group, 5-hexenyl group, 2-heptenyl group, and 2-octenyl group. Examples of the substituents which the alkenyl group may have are those as exemplified in the alkyl group.

Examples of the aryl group are phenyl group, naphthyl group, anthranyl group, fluorenyl group, phenalenyl group, phenanthranyl group, triphenylenyl group and pyrenyl group.

Examples of the alkylene group and the alkenylene group are groups corresponding to the alkyl groups and alkenyl groups, except for eliminating one hydrogen atom therefrom.

Examples of the arylene group are groups corresponding to the aryl groups, except for eliminating one hydrogen atom therefrom.

The aryl groups and arylene groups may each be substituted. Examples of such substituents are an alkyl group, an alkenyl group, hydroxyl group, a halogen atom, nitro group, carboxyl group, cyano group, trifluoromethyl group, an aryl group which may be substituted with one or more specific substituents such as a halogen atom or nitro group, and a heterocyclic group which may be substituted with one or more specific substituents such as a halogen atom or nitro group. Examples of the alkyl group, alkenyl group and aryl group are those as exemplified above. Examples of the halogen atom are those as exemplified below.

Specific examples of the heterocyclic group are furyl group, thienyl group, pyrrolyl group, benzofuranyl group, isobenzofuranyl group, benzothienyl group, indolinyl group, isoindolinyl group, carbazolyl group, pyridyl group, piperidyl group, quinolyl group, isoquinolyl group, oxazolyl group, isoxazolyl group, thiazolyl group, isothiazoyl group, imidazolyl group, pyrazolyl group, benzimidazolyl group, pyrazyl group, pyrimidinyl group, pyridazinyl group, and quinoxalinyl group.

The heterocyclic groups may be substituted with one or more substituents. Examples of such substituents are hydroxyl group, an alkyl group, a halogen atom, nitro group, carboxyl group, cyano group, an aryl group which may be substituted with one or more specific substituents such as a halogen atom or nitro group, and a heterocyclic group which may be substituted with one or more specific substituents such as a halogen atom or nitro group. The heterocyclic groups may be substituted with one or more of the hydrocarbon groups such as alkyl groups with the interposition of one or more hetero atoms such as oxygen, sulfur, and nitrogen atoms. Examples of the alkyl group, alkenyl group and aryl group herein are those as exemplified above, and examples of the halogen atom are those as exemplified below.

Specific examples of the halogen atom are fluorine, chlorine, bromine and iodine atoms.

The alkoxy group which may be substituted can be any group comprising an oxygen atom to which an alkyl group which may be substituted is directly combined. Specific examples of the alkyl group and the substituents are those as exemplified above.

The aryloxy group which may be substituted can be any group comprising an oxygen atom to which an aryl group which may be substituted is directly combined. Specific examples of the aryl group and the substituents are those as exemplified above.

The alkylthio group which may be substituted can be any group comprising a sulfur atom to which an alkyl group which may be substituted is directly combined. Specific examples of the alkyl group and the substituents are those as exemplified above.

The arylthio group which may be substituted can be any group comprising a sulfur atom to which an aryl group which may be substituted is directly combined. Specific examples of the aryl group and the substituents are those as exemplified above.

The alkylamino group which may be substituted can be any group comprising a nitrogen atom to which an alkyl group which may be substituted is directly combined. Specific examples of the alkyl group and the substituents are those as exemplified above. Alkyl groups may be combined to each other with one or more oxygen atoms and/or nitrogen atoms to form a ring, such as piperidino group, morpholino group, pyrrolidinyl group, piperazinyl group, indolyl group, and isoindolyl group.

The arylamino group which may be substituted can be any group comprising a nitrogen atom to which an aryl group which may be substituted is directly combined. Specific examples of the aryl group and the substituents are those as exemplified above.

The alkylcarbonyl group which may be substituted can be any group comprising carbonyl group, to whose carbon atom an alkyl group which may be substituted is directly combined. Examples of the alkyl group and the substituents are those as exemplified above.

The arylcarbonyl group which may be substituted can be any carbonyl group, to whose carbon atom an aryl group which may be substituted is directly combined. Specific examples of the aryl group and the substituents are those as exemplified above.

The alkoxycarbonyl group which may be substituted can be any carbonyl group, to whose carbon atom an alkoxy group which may be substituted is directly combined. Specific examples of the alkoxy group and the substituents are those as exemplified above.

The aryloxycarbonyl group which may be substituted can be any carbonyl group, to whose carbon atom an aryloxy group which may be substituted is directly combined. Specific examples of the aryloxy group and the substituents are those as exemplified above.

The alkylcarboxamido group which may be substituted can be any carboxamido group, to whose carbon atom an alkyl group which may be substituted is directly combined. Specific examples of the alkyl group and the substituents are those as exemplified above.

The arylcarboxamido group which may be substituted can be any carboxamido group, to whose carbon atom an aryl group which may be substituted is directly combined. Specific examples of the aryl group and the substituents are those as exemplified above.

The alkylcarbamoyl group which may be substituted can be any carbamoyl group, to whose nitrogen atom an alkyl group which may be substituted is directly combined. Specific examples of the alkyl group and the substituents are those as exemplified above. Alkyl groups may be combined to each other with one or more oxygen atoms and/or nitrogen atoms to form a ring, such as piperidino group, morpholino group, pyrrolidinyl group, piperazinyl group, indolyl group, and isoindolyl group.

The arylcarbamoyl group which may be substituted can be any carbamoyl group, to whose nitrogen atom an aryl group which may be substituted is directly combined. Specific examples of the aryl group and the substituents are those as exemplified above.

The alkylsulfamoyl group which may be substituted can be any sulfamoyl group, to whose nitrogen atom an alkyl group which may be substituted is directly combined. Specific examples of the alkyl group and the substituents are those as exemplified above.

The metal component in the formazan-metal chelate compound can be any metal or metallic compound that is capable of chelating with a formazan compound. Examples thereof are titanium, vanadium, chromium, manganese, iron, cobalt, nickel, copper, zinc, zirconium, niobium, molybdenum, technetium, ruthenium, rhodium, palladium and oxides and halides of these metals. Preferred examples of the metal component for use in the present invention are vanadium, manganese, iron, cobalt, nickel, copper, zinc, and palladium, as well as oxides and halides of these metals. The optical recording media using a formazan-metal chelate compound comprising any of these metals have further outstanding optical properties. Among halides of these metals, chlorides are preferred.

Specific examples of the formazan-metal chelate compounds represented by Formulae (I) and (II) are shown in Tables 1 to 3. In the following tables, "Ph" represents a phenyl group.

TABLE 1

| Comp. No. | Formazan Compound | Metal |
|---|---|---|
| A-1 | 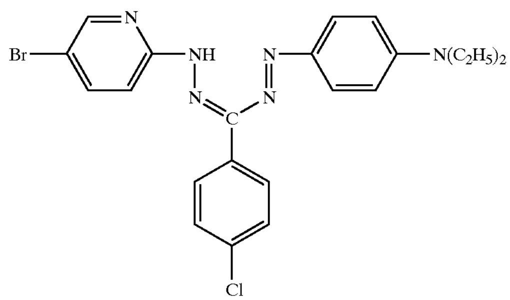 | $VCl_3$ |
| A-2 | 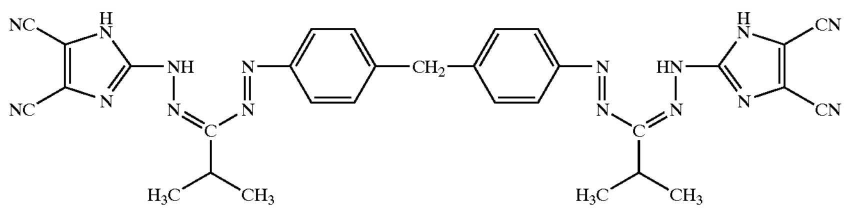 | Co |
| A-3 | 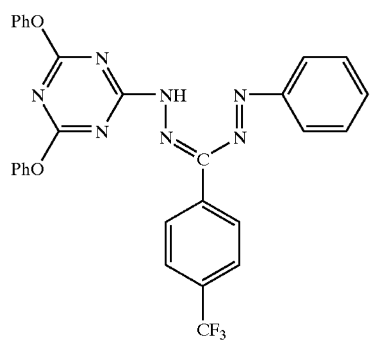 | Ni |
| A-4 | 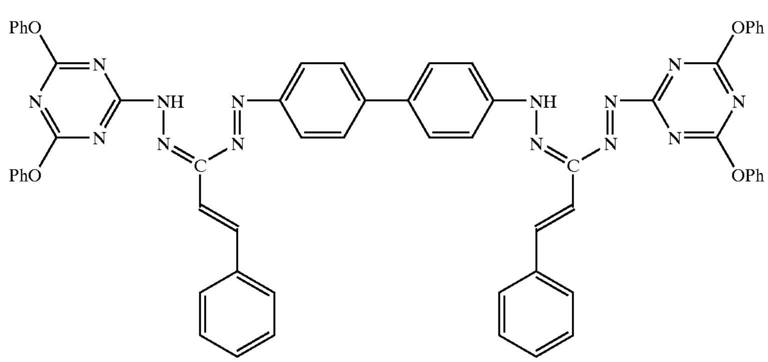 | Cu |

TABLE 1-continued
| Comp. No. | Formazan Compound | Metal |
| --- | --- | --- |
| A-5 | 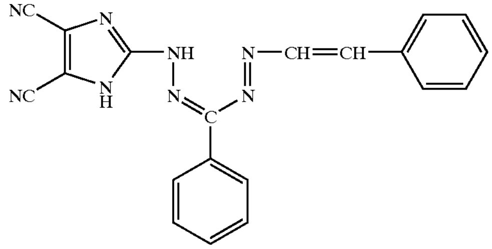 | Ni |
TABLE 2
| Comp. No. | Formazan Compound | Metal |
| --- | --- | --- |
| A-6 | 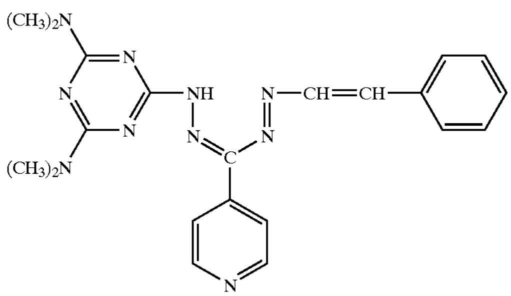 | Co |
| A-7 | 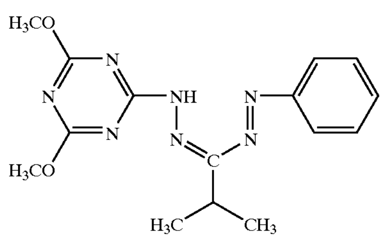 | Cu |
| A-8 | 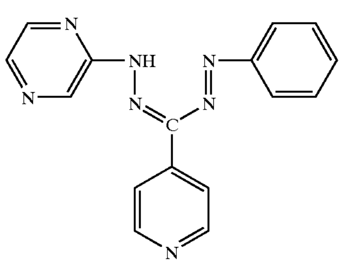 | Ni |
| A-9 | 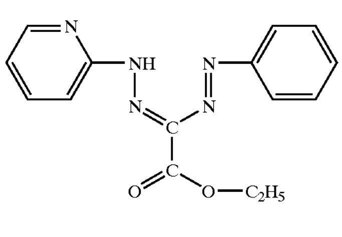 | Co |

TABLE 2-continued
| Comp. No. | Formazan Compound | Metal |
| --- | --- | --- |
| A-10 | 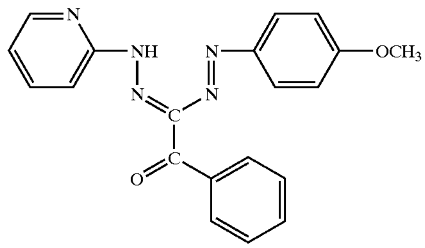 | Cu |
| A-11 | 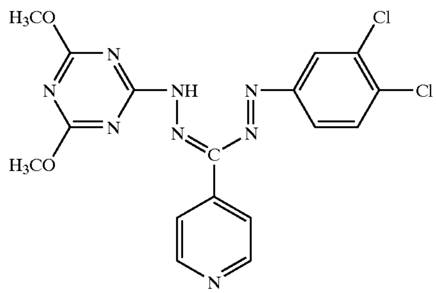 | Cu |
TABLE 3
| Comp. No. | Formazan Compound | Metal |
| --- | --- | --- |
| A-12 | 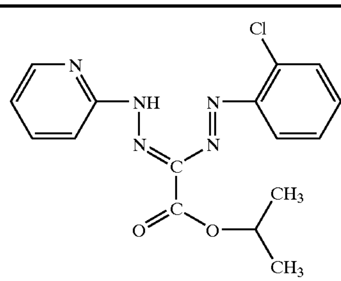 | Ni |
| A-13 | 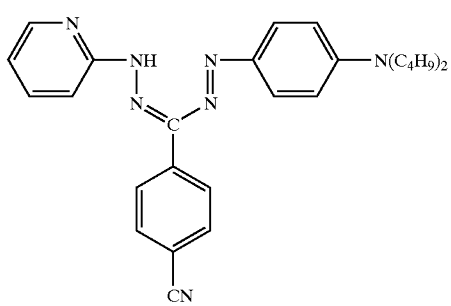 | $FeCl_3$ |
| A-14 | 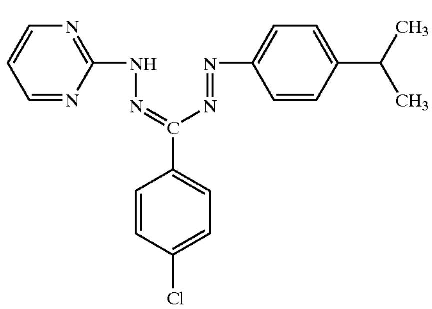 | Mn |

TABLE 3-continued

| Comp. No. | Formazan Compound | Metal |
|---|---|---|
| A-15 | 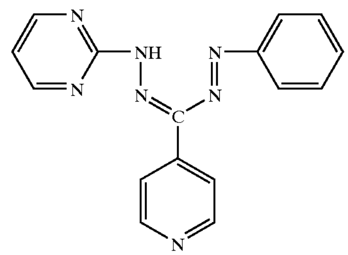 | Co |
| A-16 | 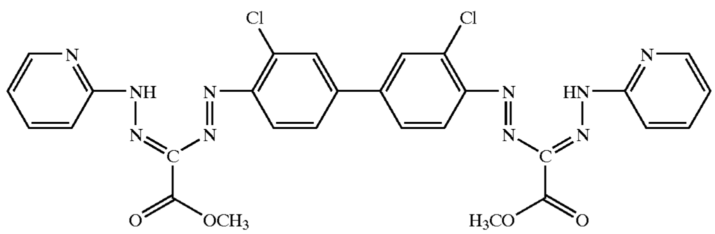 | Ni |

The squarylium-metal chelate compound will be described in detail below.

The squarylium compound for use in the present invention can be any of conventional or known squarylium compounds.

Laser light at wavelengths of 600 nm to 720 nm is preferably used in the present invention to record and read information on the optical recording medium. For better optical properties at the recording-reading wavelength, squarylium-metal chelate compounds represented by following Formula (III) are preferred.

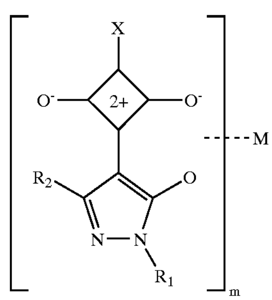

(III)

In Formula (III), "$R_1$" and "$R_2$" are the same or different and are independently one selected from the group consisting of a hydrogen atom, an aliphatic group which may be substituted, an aralkyl group which may be substituted, an aryl group which may be substituted and a heterocyclic group which may be substituted; "M" is a metal atom capable of coordinating; m is an integer of 2 or 3; "X" is one selected from the group consisting of an aryl group which may be substituted, a heterocyclic group which may be substituted and $Z_3$=CH—, wherein "$Z_3$" is a heterocyclic group which may be substituted.

The substituent "X" in Formula (III) is preferably a nitrogen-containing cyclic group represented by following Formula (IV):

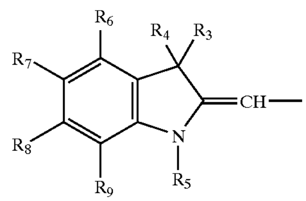

(IV)

In Formula (IV), "$R_3$" and "$R_4$" are the same or different and are independently an aliphatic group which may be substituted, or "$R_3$" and "$R_4$" may be taken together with an adjacent carbon atom to form one of a hydrocarbon ring and a heterocyclic ring; "$R_5$" is one selected from the group consisting of hydrogen atom, an aliphatic group which may be substituted, an aralkyl group which may be substituted and an aryl group which may be substituted; "$R_6$," "$R_7$," "$R_8$" and "$R_9$" are the same or different and are independently one selected from the group consisting of a hydrogen atom, a halogen atom, an aliphatic group which may be substituted, an aralkyl group which may be substituted, an aryl group which may be substituted, nitro group, cyano group and an alkoxy group which may be substituted, wherein adjacent two of "$R_6$," "$R_7$," "$R_8$" and "$R_9$" may be taken together with two adjacent carbon atoms to form one of a hydrocarbon ring which may be substituted and a heterocyclic ring which may be substituted.

The aliphatic group includes alkyl groups and alkenyl groups. These alkyl groups and alkenyl groups can be linear, branched or cyclic. In the case of a straight aliphatic group, it preferably has 1 to 6 carbon atoms. In the case of a cyclic aliphatic group, it preferably has 3 to 8 carbon atoms.

Specific examples of the aliphatic group are alkyl groups each having 1 to 8 carbon atoms, such as methyl group, ethyl group, propyl group, isopropyl group, butyl group, isobutyl group, sec-butyl group, tert-butyl group, pentyl group, isopentyl group, 1-methylbutyl group, 2-methylbutyl group, tert-pentyl group, hexyl group, cyclopropyl group, cyclobutyl group, cyclopentyl group, cyclohexyl group, cycloheptyl group and cyclooctyl group; and alkenyl groups each having 2 to 8 carbon atoms, such as vinyl group, allyl group, 1-propenyl group, methacryl group, crotyl group, 1-butenyl group, 3-butenyl group, 2-pentenyl group, 4-pentenyl group, 2-hexenyl group, 5-hexenyl group, 2-heptenyl group, and 2-octenyl group.

The alkyl group in the alkoxy group can be a straight or cyclic alkyl group. In the case of a chain-like alkyl group, it preferably has 1 to 6 carbon atoms. In the case of a cyclic alkyl group, it preferably has 3 to 8 carbon atoms. Specific examples of the alkyl group are those as exemplified above.

The aralkyl group is preferably an aralkyl group having 7 to 15 carbon atoms. Specific examples thereof are benzyl group, phenethyl group, phenylpropyl group and naphthylmethyl group.

The aryl group is preferably an aryl group having 6 to 18 carbon atoms. Specific examples thereof are phenyl group, naphthyl group, anthryl group and azulenyl group.

Examples of the halogen atom are chlorine atom, bromine atom, fluorine atom and iodine atom.

Examples of the substituents which may be substituted on the aralkyl group, aryl group, alkoxy group, aromatic ring, heterocyclic group, and the hydrocarbon ring which is formed by taking adjacent two of "$R_6$," "$R_7$," "$R_8$" and "$R_9$" together with two adjacent carbon atoms, are hydroxyl group, carboxyl group, a halogen atom, an alkyl group, an alkoxy group, a nitro group, and an amino group which may be substituted. Examples of the halogen atom, alkyl group and alkoxy group are those as exemplified above. Each of the aforementioned groups may have one or more of these substituents.

Examples of the substituents which may be substituted on the aliphatic group are hydroxyl group, carboxyl group, halogen atoms and alkoxy groups. Examples of the halogen atoms and the alkoxy groups are the same as mentioned above. The aliphatic group may have one or more of these substituents.

Examples of the substituent which may be substituted on the amino group are one or two alkyl groups which may be the same or different. Examples of the alkyl group are those as exemplified above.

The metal atom "M" can be any metal capable of coordinating with a squarylium compound, such as aluminum, zinc, copper, iron, nickel, chromium, cobalt, manganese, iridium, vanadium, and titanium. Among them, copper, nickel and aluminum are preferred, of which aluminum is typically preferred. The optical recording media using a squarylium-aluminum chelate compound have typically outstanding optical properties.

The hydrocarbon ring which is formed by taking adjacent two of "$R_6$," "$R_7$," "$R_8$" and "$R_9$" together with two adjacent carbon atoms, includes aromatic rings each having 6 to 14 carbon atoms, such as benzene ring, as well as aliphatic rings each having 3 to 10 carbon atoms, such as cyclohexane ring.

In Formula (III), examples of the heterocyclic rings in the heterocyclic group and of heterocyclic rings formed by "$R_3$" and "$R_4$" are five- or six-membered monocyclic aromatic or aliphatic heterocyclic rings each containing at least one selected from nitrogen, oxygen and sulfur atoms; and bicyclic or tricyclic fused aromatic or aliphatic heterocyclic rings comprising three- to eight-membered rings and having at least one selected from nitrogen, oxygen and sulfur atoms. Specific examples thereof are pyridine ring, pyrazine ring, pyrimidine ring, pyridazine ring, quinoline ring, isoquinoline ring, phthalazine ring, quinazoline ring, quinoxaline ring, naphthyridine ring, cinnoline ring, pyrrole ring, pyrazole ring, imidazole ring, triazole ring, tetrazole ring, thiophene ring, furan ring, thiazole ring, oxazole ring, indole ring, isoindole ring, indazole ring, benzimidazole ring, benzotriazole ring, benzothiazole ring, benzoxazole ring, purine ring, carbazole ring, pyrrolidine ring, piperidine ring, piperazine ring, morpholine ring, thiomorpholine ring, homopiperidine ring, homopiperazine ring, tetrahydropyridine ring, tetrahydroquinoline ring, tetrahydroisoqunoline ring, tetrahydrofuran ring, tetrahydropyran ring, dihydrobenzofuran ring, and tetrahydrocarbazole ring.

Examples of the heterocyclic group "$Z_3$" in Formula (III) are indoline ring, thiazole ring, dihydroquinoline ring and quinoxaline ring. Specific examples thereof are indolin-2-ylidene, benz[e]indolin-2-ylidene,
2-benzothiazolinylidene,
naphtho[2,1-d]thiazol-2(3H)-ylidene,
naphtho[1,2-d]thiazol-2(1H)-ylidene,
1,4-dihydroquinolin-4-ylidene,
1,2-dihydroquinolin-2-ylidene,
2,3-dihydro-1H-imidazo[4,5-d]quinoxalin-2-ylidene, and
2-benzoselenazolinylidene.

Preferred examples of the hydrocarbon ring which is formed by taking "$R_3$" and "$R_4$" together with an adjacent carbon atom, are saturated or unsaturated alicyclic hydrocarbon ring having three to eight carbon atoms, such as cyclopropane ring, cyclobutane ring, cyclopentane ring, cyclohexane ring, cycloheptane ring, cyclooctane ring, cyclopentene ring, 1,3-cyclopentadiene ring, cyclohexene ring, and cyclohexadiene rings.

Reaction formulae in general production of the compounds of Formula (III) will be illustrated below. Hereinafter, the compound represented by Formula (III) may be referred to as "Compound (III)". This is also true for the other compounds.

(1) Reaction Formula (1-a)

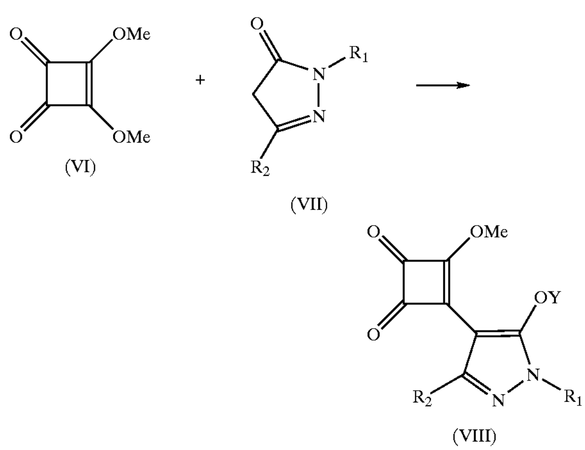

(2) Reaction Formula (1-b)

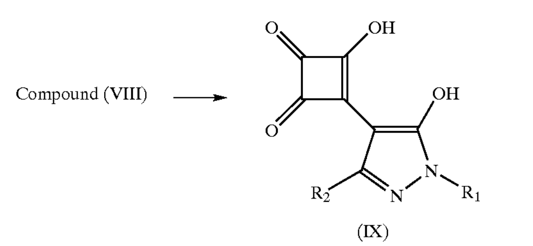

-continued (3) Reaction Formula (1-c)

Compound (IX) + X—H ⟶

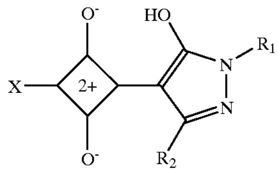

(X)

(4) Reaction Formula (1-d)

Compound (X) $\xrightarrow{M^{m+}}$ Compound (III)

In these formulae, "$R_1$," "$R_2$," "X," "M" and m have the same meanings as defined above; "Y" represents, for example, hydrogen atom, potassium atom or sodium atom; and "Me" represents methyl group.

The preparation of Compound according to Reaction Formula (1-a) will be illustrated below.

Compound (VIII) can be prepared by reacting Compound (VI) with 0.5 to 2 times by mole of Compound (VII) in a solvent, where necessary, in the presence of a base at a temperature from room temperature to 40° C. for 30 minutes to 15 hours.

Examples of the base include an inorganic base such as potassium carbonate, sodium carbonate or potassium hydroxide, and an organic base such as triethylamine or sodium methoxide.

Examples of the solvent include methanol, ethanol and dimethylformamide.

The preparation of Compound according to Reaction Formula (1-b) will be illustrated below.

Compound (IX) can be prepared by reacting Compound (VIII) in a basic solvent or in an acidic solvent at room temperature to 40° C. for 30 minutes to 15 hours.

Examples of the basic solvent are aqueous potassium carbonate solution, aqueous sodium carbonate solution and aqueous potassium hydroxide solution.

Examples of the acidic solvent are 50% by volume/volume solution of hydrochloric acid in aqueous dimethyl sulfoxide solution and 50% by volume/volume solution of hydrochloric acid in aqueous dimethylformamide solution.

The preparation of Compound according to Reaction Formula (1-c) will be illustrated below.

Compound (X) can be prepared by reacting Compound (IX) with 0.5 to 2 times by mole of X-H in a solvent and where necessary in the presence of 0.5 to 2 times by mole of a base at 80° C. to 120° C. for 1 to 15 hours.

Examples of the solvent are a single use of an alcohol solvent having two to eight carbon atoms, such as ethanol, propanol, isopropanol, butanol or octanol, or a mixture of the alcohol solvent with benzene, toluene or xylene. In the mixture, the amount of alcohol is preferably 50% by volume/volume or more.

Examples of the base are organic bases such as quinoline, triethylamine and pyridine; and inorganic bases such as potassium carbonate, potassium hydrogencarbonate and sodium hydrogencarbonate.

Production of Compound (III) according to Reaction Formula (1-d) will be illustrated below.

Compound (III) can be prepared by reacting Compound (X) with (0.5 to 2)/m times by mole of $M^{m+}$ (a material yielding a metal ion), where necessary in the presence of 0.5 to 2 times by mole of acetic acid, in a solvent at a temperature from room temperature to 120° C. for 1 to 15 hours.

Examples of the material yielding the metal ion are aluminum tris(acetylacetonate), aluminum tris (ethylacetoacetate), aluminum isopropoxide, aluminum sec-butoxide, aluminum ethoxide, aluminum chloride, copper chloride, copper acetate and nickel acetate.

Examples of the solvent are a halogen solvent such as chloroform or dichloromethane; an aromatic solvent such as toluene or xylene; an ether solvent such as tetrahydrofuran or methyl tert-butyl ether; and an ester solvent such as ethyl acetate.

Specific examples of the compounds represented by Formula (III) are shown in Tables 4 to 6. In the following tables, "Ph" represents a phenyl group.

TABLE 4

| Comp. No. | Squarylium Compound | Metal |
|---|---|---|
| B-1 | 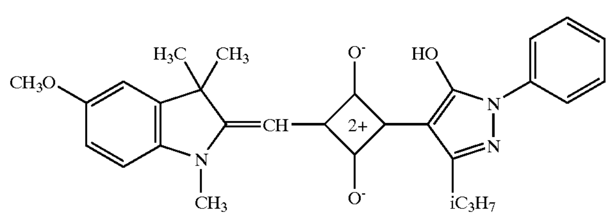 | Al |
| B-2 | 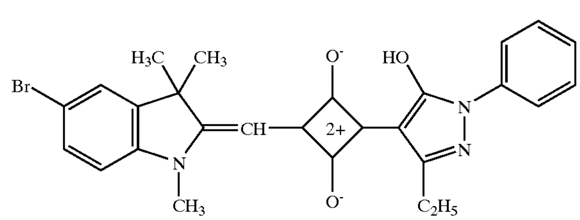 | Al |

TABLE 4-continued
| Comp. No. | Squarylium Compound | Metal |
|---|---|---|
| B-3 | 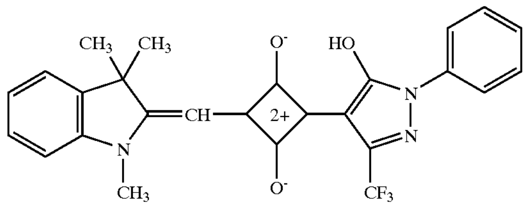 | Ni |
| B-4 | 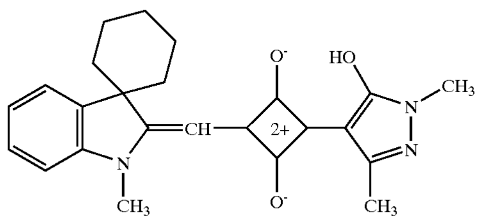 | Al |
| B-5 | 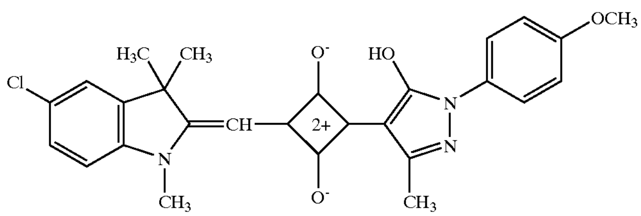 | Al |
| B-6 | 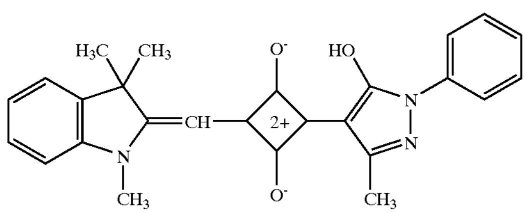 | Al |
| B-7 | 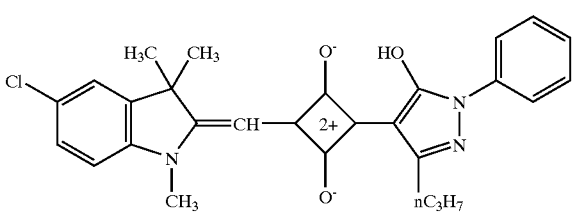 | Al |
TABLE 5
| Comp. No. | Squarylium Compound | Metal |
|---|---|---|
| B-8 | 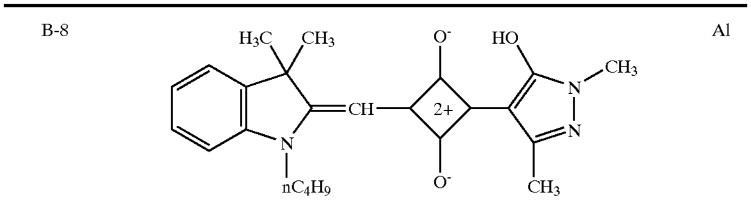 | Al |

TABLE 5-continued
| Comp. No. | Squarylium Compound | Metal |
| --- | --- | --- |
| B-9 | 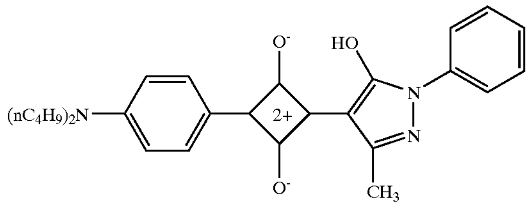 | Cu |
| B-10 | 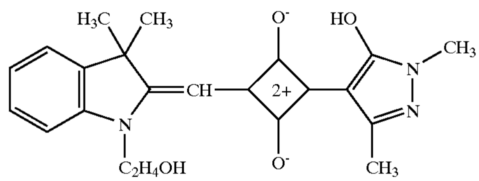 | Al |
| B-11 | 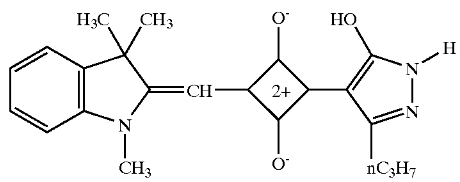 | Al |
| B-12 | 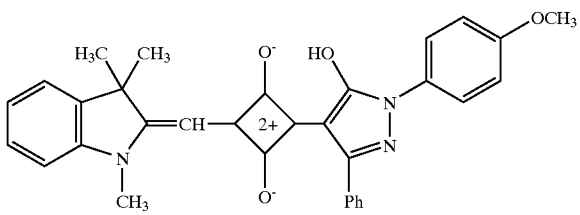 | Al |
| B-13 | 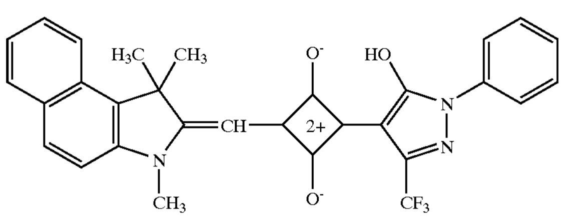 | Al |
| B-14 | 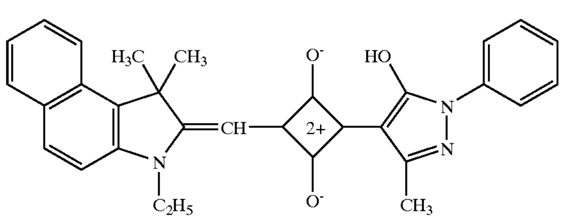 | Cu |

TABLE 6

| Comp. No. | Squarylium Compound | Metal |
|---|---|---|
| B-15 | 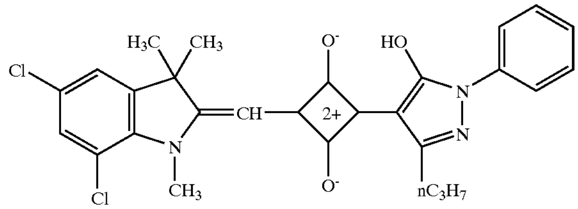 | Al |
| B-16 | 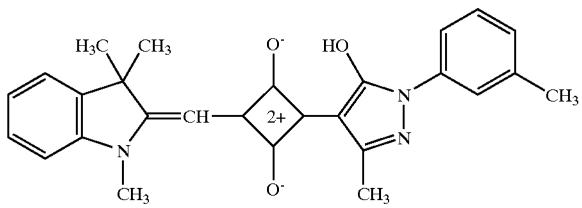 | Al |
| B-17 | 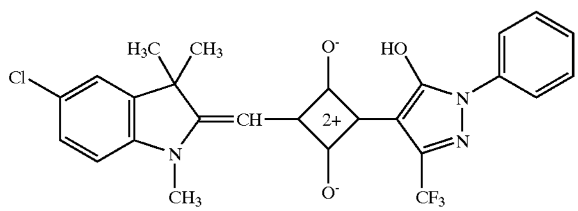 | Al |
| B-18 | 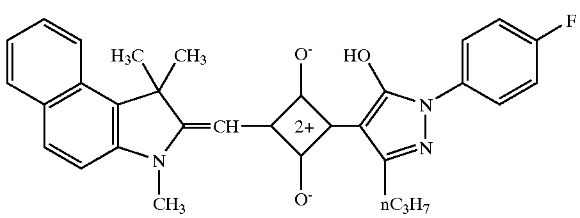 | Al |

Next, the diarylamine compound will be illustrated below.

The diarylamine compound for use in the present invention can be any of conventional or known diarylamine compounds, as long as it has a maximum absorption in a range of a wavelength of 650 nm to 800 nm in terms of a film.

The optical recording media of the present invention have properties less dependent on wavelengths of semiconductor laser, by adding diarylamine compound having a maximum absorption in a range of a wavelength of 650 nm to 800 nm in terms of a film to a mixture comprising a formazan-metal chelate compound and a squarylium-metal chelate compound each having a maximum absorption in a range of a wavelength of 500 nm to 650 nm. The diarylamine compound preferably has a structure represented by following Formula (V).

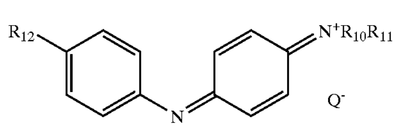

(V)

In Formula (V), "$R_{10}$" and "$R_{11}$" are the same or different and are independently one of hydrogen atom and an alkyl group which may be substituted; "$R_{12}$" is one selected from the group consisting of hydrogen atom, an alkyl group which may be substituted and an alkylamino group which may be substituted; and "$Q^-$" is an anion. Examples of the anion are $I^-$, $ClO_4^-$, $BF_4^-$, $PF_6^-$, and $SbF_6^-$.

The alkyl group preferably has 1 to 15 carbon atoms, and more preferably 1 to 8 carbon atoms. Examples of the substituent thereon are those as exemplified in Formula (I).

Specific examples of the compounds represented by Formula (V) are shown in Table 7.

TABLE 7

| Comp. No. | Diarylamine Compound | Counter Ion |
|---|---|---|
| C-1 | 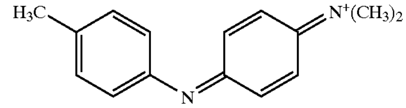 | $ClO_4^-$ |
| C-2 | 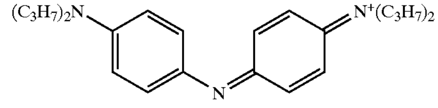 | $BF_4^-$ |

TABLE 7-continued

| Comp. No. | Diarylamine Compound | Counter Ion |
|---|---|---|
| C-3 | 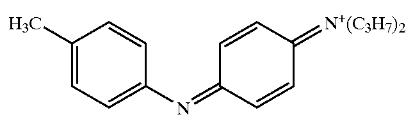 | $ClO_4^-$ |
| C-4 | 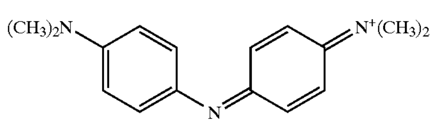 | $ClO_4^-$ |
| C-5 | 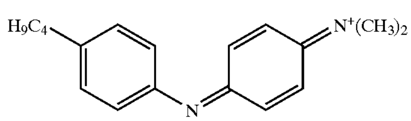 | $ClO_4^-$ |
| C-6 | 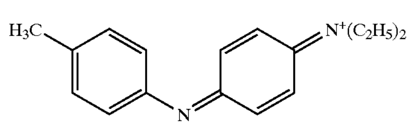 | $SbF_6^-$ |
| C-7 | 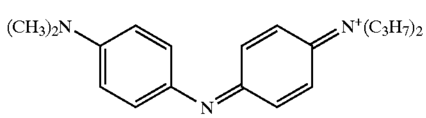 | $PF_6^-$ |
| C-8 | 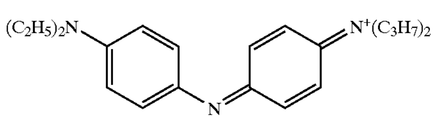 | $ClO_4^-$ |
| C-9 | 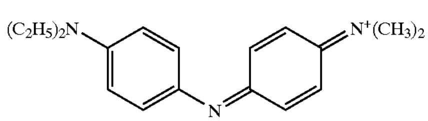 | $ClO_4^-$ |
| C-10 | 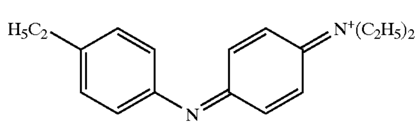 | $ClO_4^-$ |
| C-11 | 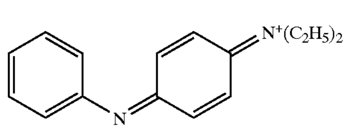 | $I^-$ |

The weight ratio of the formazan-metal chelate compound to the squarylium-metal chelate compound in the recording layer is preferably from 10:90 to 50:50. The content of the diarylamine compound in the recording layer is preferably from 0.5% by weight to 20% by weight and more preferably from 1% by weight to 5% by weight to the total weight of the formazan-metal chelate compound and the squarylium-metal chelate compound. Within the above-specified weight ratios, the formazan-metal chelate compound effectively works to yield high light-resistance and the squarylium-metal chelate compound works to yield a high reflectance. Within the above-specified contents of the diarylamine compound, the optical recording medium has properties less dependent on a varying wavelength of laser light and shows more stable recording sensitivity with respect to such a varying wavelength, while it maintains its excellent fundamental properties as a recordable DVD medium, such as reflectance. More specifically, the formazan-metal chelate compound and the squarylium-metal chelate compound each have a maximum absorption in a range of a wavelength of 500 nm to 650 nm. By adding diarylamine compound having a maximum absorption in a range of a wavelength of 650 nm to 800 nm, near to the recording-reading wavelength, to the mixture of these compounds, the above advantages are obtained.

The recording layer of the optical recording medium should have satisfactory optical properties and light-resistance.

For satisfactory optical properties, the recording layer preferably has a large absorption band at shorter wavelengths than the recording-reading wavelength ranging from 600 nm to 720 nm and the recording-reading wavelength preferably stands in the vicinity of a longer-wavelength edge in the absorption band. In other words, the recording layer preferably has a large refractive index and a large extinction coefficient at the recording-reading wavelength ranging from 600 nm to 720 nm.

More specifically, the recording layer alone preferably has a refractive index "n" of 1.5 to 3.0 and an extinction coefficient "k" of 0.02 to 0.3 with respect to light with a wavelength ±5 nm of the recording-reading wavelength. A refractive index "n" of 1.5 or more yields a satisfactory optical change and a high recording modulation factor. A refractive index "n" of 3.0 or less yields decreased dependency on wavelength, thus reducing error at the recording-reading wavelength. An extinction coefficient "k" of 0.02 or more leads to high recording sensitivity. An extinction coefficient "k" of 0.3 or less easily leads to a reflection ratio of 50% or more. The recording layer preferably has log $\epsilon$ of 5 or more, wherein "$\epsilon$" is a molar extinction coefficient, since the refractive index "n" increases with an increasing extinction coefficient.

For better light-resistance, the recording layer preferably has reproduction stability so as to read information thereon million times or more and has such a light-resistance not to be faded when left indoors.

The substrate may generally have a guide groove having a depth of 100 nm to 250 nm (1000–2500 angstroms). The track pitch of the guide grooves is generally from 0.7 82 m to 1.0 μm and is preferably from 0.7 μm to 0.8 μm for higher capacity. The groove width is, at a half width, preferably 0.18 μm to 0.40 μm. At the half width of 0.18 μm or greater, tracking error signals having a sufficient intensity can be attained easily. At the half width of 0.40 μm or less, spreading of a recorded portion in the width direction can be prevented.

Next, the configurations of the optical recording media of the present invention will be illustrated.

FIGS. 2A, 2B, 2C and 2D each illustrate a possible layer configuration of the optical recording media as recordable optical disks. The optical recording media can comprise a substrate 1, a recording layer 2 arranged on the substrate 1, where necessary with the interposition of an undercoat layer 3, and a protective layer 4 arranged according to necessity. The media may further comprise a hardcoat layer 5 on an opposite side of the substrate 1.

Figure 3A:
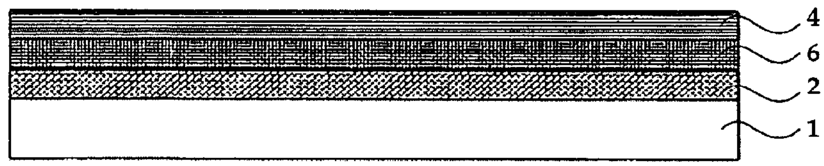
FIGS. 3A, 3B and 3C are each a schematic diagram of a CD-R medium.
Figure 3B:
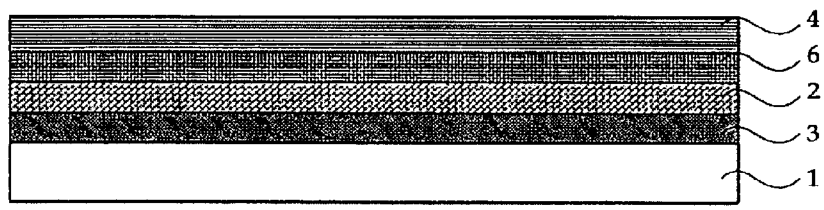
Figure 3C:
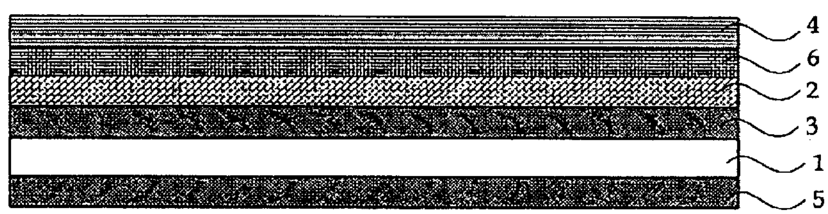

FIGS. 3A, 3B and 3C each illustrate another possible layer configuration of the optical recording media as CD-R media. In these configurations, a reflective layer 6 is arranged on the recording layer 2 of the configurations shown in FIGS. 2C and 2D.

Figure 4A:
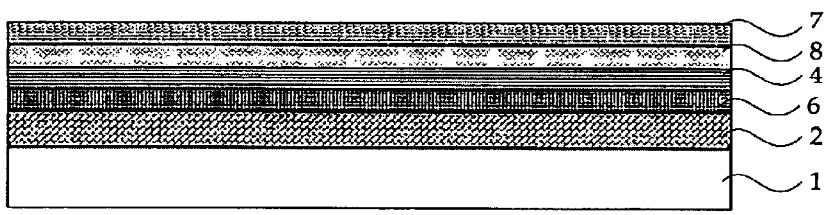
FIGS. 4A and 4B are each a schematic diagram of a recordable DVD medium.
Figure 4B:
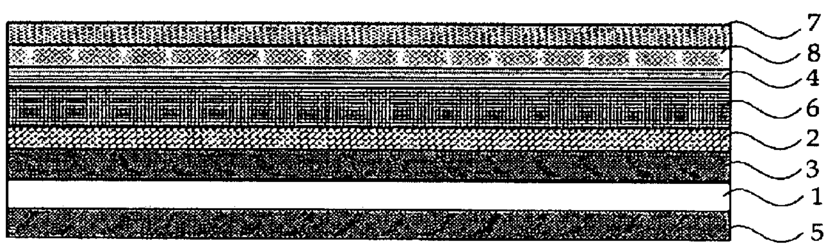

FIGS. 4A and 4B each illustrate another possible layer configuration of the optical recording media as DVD-R media. In the configurations shown in FIGS. 4A and 4B, an adhesive layer 8 and a protective substrate 7 are arranged on the protective layer 4 of the configurations shown in FIGS. 3A and 3C.

More specifically, the optical recording media can have an air-sandwiched structure comprising the layer configuration of any of FIGS. 2A through 2D and 3A, 3B and 3C and another substrate with the interposition of space or have a cladding structure comprising the layer configuration and another substrate with the interposition of a protective layer.

When the optical recording media are used as recordable DVD media, they basically comprise a first substrate and a second substrate bonded via the recording layer with an adhesive. The recording layer may comprise an organic dye layer alone or may have a multilayer structure comprising an organic dye layer and a metal reflective layer for higher reflectance. The recording layer may be arranged on the substrate with the interposition of an undercoat layer and/or protective layer and may have these layers thereon for better functions. The configuration most generally employed is the configuration of the first substrate, recording layer (organic dye layer), metal reflective layer, protective layer, adhesive layer and second substrate arranged in this order.

Substrate

When radiation for recording and/or reading is applied to the recording layer through the substrate, the substrate must be optically transparent to radiation (laser light). If not, there is no need for the substrate to be optically transparent. When the optical recording medium comprises two substrates, one of the two substrates, e.g., the second substrate, must be optically transparent, and the other substrate, e.g., the first substrate, can be optically transparent or opaque.

Materials for the substrate are plastics such as polyesters, acrylic resins, polyamides, polycarbonates, polyolefins, phenolic resins, epoxy resins and polyimides, as well as glass, ceramics and metals.

The substrate, or the first substrate in the case of using two substrates, may have any of tracking guide grooves, guide pits, and preformats such as address signals.

Recording Layer

The recording layer must undergo some optical change upon irradiation of laser light, by which information can be recorded thereon, and must comprise a dye mixture, i.e., a mixture of the formazan-metal chelate compound, the squarylium-metal chelate compound and the diarylamine compound. The dye mixture constitutes one of the features of the present invention.

The formazan-metal chelate compounds can be used alone or in combination. The same is true for the squarylium-metal chelate compounds and the diarylamine compounds, respectively. The recording layer may further comprise any of other organic dyes or may have another layer of such other organic dyes for better optical properties, recording sensitivity and signal properties.

Examples of the other organic dyes are polymethine, naphthalocyanine, phthalocyanine, chroconium, pyrylium, naphthoquinone, anthraquinone (indanthrene), xanthene, triphenylmethane, azulene, tetrahydrocholine, phenanthrene, and triphenothiazine dyes, as well as metal chelate compounds. Each of these dyes can be used alone or in combination.

The dye layer (recording layer) may further comprise a metal or a compound thereof as a constitutional component dispersed therein or as another layer. Examples of the metal and compound thereof are In, Te, Bi, Se, Sb, Ge, Sn, Al, Be, $TeO_2$, SnO, As, and Cd.

The recording layer may further comprise any of polymeric materials such as ionomer resins, polyamides, vinyl resins, naturally-occurring polymers, silicones, and liquid rubber, as well as silane coupling agents. It may further comprise any of additives such as stabilizers including transition metal complexes, dispersants, flame retardants, lubricants, antistatics, surfactants and plasticizers for better properties.

The recording layer can be prepared according to a conventional procedure such as vapor deposition, sputtering, chemical vapor deposition or coating using a solvent. For example, the recording layer can be prepared by coating in which the dyes and other components is dissolved in an organic solvent and the solution is applied according to a conventional coating procedure such as spraying, roller coating, dipping or spin coating.

Examples of the organic solvent are alcohols such as methanol, ethanol, isopropanol; ketones such as acetone, methyl ethyl ketone, cyclohexanone; amides such as N,N-dimethylformamide, N,N-dimethylacetamide; sulfoxides such as dimethyl sulfoxide; ethers such as tetrahydrofuran, dioxane, diethyl ether, ethylene glycol monomethyl ether; esters such as methyl acetate, ethyl acetate; halogenated aliphatic hydrocarbons such as chloroform, methylene chloride, dichloroethane, carbon tetrachloride, trichloroethane; aromatic hydrocarbons such as benzene, xylenes, monochlorobenzene, dichlorobenzenes; aliphatic or alicyclic hydrocarbons such as hexane, pentane, cyclohexane, methylcyclohexane.

The thickness of the recording layer is preferably from 10 nm (100 angstroms) to 10 $\mu$m, and more preferably from 20 nm to 200 nm (200–2000 angstroms).

Undercoat Layer

The undercoat layer is arranged typically for (a) better adhesion, (b) water- or gas-barrier, (c) better storage stability of the recording layer, (d) higher reflectance, (e) protection of the substrate and/or recording layer from solvents, and/or (f) formation of guide grooves, guide pits and/or preformats.

Suitable materials for the undercoat layer for better adhesion (a) are polymeric materials such as ionomer resins, polyamides, vinyl resins, naturally-occurring resins and polymers, silicones and liquid rubber, as well as silane coupling agents. Materials for water- or gas-barrier (b) and for better storage stability (c) include, in addition to the polymeric materials, inorganic compounds such as $SiO_2$, $MgF_2$, SiO, $TiO_2$, ZnO, TiN and SiN, as well as metals and semimetals such as Zn, Cu, Ni, Cr, Ge, Se, Au, Ag, and Al. Materials for higher reflectance (d) include metals such as Al and Ag, as well as organic thin films having a metallic luster, such as thin films of a methine dye or xanthene dye. Materials for protection (e) and formation of guide grooves etc. (f) include ultraviolet curable resins, thermosetting resins and thermoplastic resins.

The thickness of the undercoat layer is preferably from 0.01 $\mu$m to 30 $\mu$m, and more preferably from 0.05 $\mu$m to 10 $\mu$m.

Metal Reflective Layer

Materials for the metal reflective layer include metals and semimetals each having a high reflectance and being resistant to corrosion, such as Au, Ag, Cr, Ni, Al, Fe, Sn and Cu. Among them, Au, Ag, Al and Cu are preferred for higher reflectance and productivity. Each of these metals and semimetals can be used alone or in combination as an alloy.

The metal reflective layer can be prepared typically by vapor deposition or sputtering. The thickness thereof is preferably from 5 nm to 500 nm (50–5000 angstroms), and more preferably from 10 nm to 300 nm (100–3000 angstroms).

Protective Layer, Substrate-surface Hardcoat Layer

The protective layer or substrate-surface hardcoat layer is arranged typically for (a) protection of the recording layer (reflection-absorption layer) from flaws, dust and stain, (b) better storage stability of the recording layer (reflection-absorption layer), and/or (c) higher reflectance. Materials thereof include materials exemplified in the aforementioned interlayers. The materials also include inorganic materials such as SiO and $SiO_2$; and organic materials such as poly(methyl acrylate)s, polycarbonates, epoxy resins, polystyrenes, polyesters, vinyl resins, cellulose, aliphatic hydrocarbon resins, aromatic hydrocarbon resins, naturally-occurring rubber, styrene-butadiene resins, chloroprene rubber, waxes, alkyd resins, drying oils, rosin, and other thermosoftening resins, thermofusible (hot-melt) resins, and ultraviolet curable resins. Among them, ultraviolet resins are typically preferred as the material for the protective layer or substrate-surface hardcoat layer for better productivity.

The thickness of the protective layer or substrate-surface hardcoat layer is preferably from 0.01 μm to 30 μm, and more preferably from 0.05 μm to 10 μm.

The undercoat layer, protective layer, and substrate-surface hardcoat layer may further comprise any of additives such as stabilizers, dispersants, flame retardants, lubricants, antistatics, surfactants and plasticizers.

Protective Substrate

When laser light is applied to the recording layer through the protective substrate, the protective substrate must be optically transparent to the laser light. If not, it may be optically transparent or opaque. Materials for the protective substrate are the same as the substrate, including plastics such as polyesters, acrylic resins, polyamides, polycarbonates, polyolefins, phenolic resins, epoxy resins and polyimides, as well as glass, ceramics and metals.

Adhesive Layer

The adhesive for use in the adhesive layer can be any of materials that can bond two recording media. Among them, ultraviolet curable resins and hot-melt resins are preferred for better productivity.

The optical recording media of the present invention are information recording media having excellent light-resistance and storage stability, on which information can be recorded and read using laser light at a wavelength of 600 nm to 720 nm. They are also optical recording media having properties less dependent on a varying wavelength of semiconductor laser than conventional equivalents comprising a mixture of a formazan-metal chelate compound and a squarylium-metal chelate compound alone in the recording layer. They are information recording media on which information can be recorded and read stably at a high reflectance and a high degree of modulation. Information can be stably recorded and read thereon. The optical recording media can yield novel recording method and device in which information can be recorded at specific wavelengths.

The present invention will be illustrated in further detail with reference to several examples below, which are not intended to limit the scope of the present invention.

EXAMPLE 1

A coating composition was prepared by dissolving a mixture of Compounds A-9, B-4 and C-4 in proportions shown in Table 8 in 2,2,3,3-tetrafluoropropanol. The coating composition was applied to a polycarbonate substrate by spin coating to form an organic dye layer 100 nm (1000 angstroms) thick. The polycarbonate substrate was prepared by injection molding, had a thickness of 0.6 mm and carried guide-grooves having a depth of 175 nm (1750 angstroms), a half width of 0.25 μm and a track pitch of 0.74 μm. Then, a gold reflective layer 130 nm (1300 angstroms) thick was formed on the organic dye layer by sputtering, followed by formation of a protective layer of an acrylic photopolymer 5 μm thick thereon. Another injection-molded polycarbonate substrate 0.6 mm thick was bonded to the protective layer using an acrylic photopolymer to thereby yield an optical recording medium.

EXAMPLES 2 TO 10

A series of optical recording media was prepared by the procedure of Example 1, except for using dyes shown in Table 8.

COMPARATIVE EXAMPLE 1

A series of optical recording media was prepared by the procedure of Example 1, except for using dyes shown in Table 8.

The resulting optical recording medium contained no diarylamine compound in the recording layer.

Recording Conditions

Signals were recorded on a sample optical recording medium by the application of semiconductor laser light at an oscillation wavelength of 658 nm and a beam diameter of 1.0 μm with tracking at a linear velocity of 3.5 m/sec. The recorded signals were then read using continuous light of semiconductor laser at an oscillation wavelength of 658 nm at a reading power of 0.7 mW, and the read waveforms were observed. The recording and reading procedure was repeated using semiconductor laser at an oscillation wavelength of 670 nm, and reflectance and recording sensitivity were measured with Optical Disc Drive Device DDU-1000 manufactured by Pulstec Industrial Co., Ltd. The results are shown in Table 8.

TABLE 8

| | Dye* | | | 658 nm | | 670 nm | |
|---|---|---|---|---|---|---|---|
| | Formazan-metal chelate compound | Squarylium-metal chelate compound | Diarylamine compound | Reflectance (%) | Recording sensitivity (mW) | Reflectance (%) | Recording sensitivity (mW) |
| Ex. 1 | A-9 (40) | B-4 (60) | C-4 (4) | 49 | 7.8 | 49 | 8.0 |
| Ex. 2 | A-5 (25) | B-13 (75) | C-2 (2) | 51 | 8.0 | 52 | 8.3 |
| Ex. 3 | A-16 (10) | B-5 (90) | C-8 (8) | 50 | 7.5 | 49 | 7.7 |
| Ex. 4 | A-13 (50) | B-18 (50) | C-11 (0.5) | 49 | 8.1 | 51 | 8.6 |
| Ex. 5 | A-3 (45) | B-7 (55) | C-9 (10) | 47 | 7.7 | 46 | 7.9 |
| Ex. 6 | A-11 (40) | B-8 (60) | C-7 (5) | 47 | 7.9 | 47 | 8.1 |
| Ex. 7 | A-1 (30) | B-12 (70) | C-6 (2) | 52 | 7.9 | 52 | 8.2 |

TABLE 8-continued

| | Dye* | | | 658 nm | | 670 nm | |
|---|---|---|---|---|---|---|---|
| | Formazan-metal chelate compound | Squarylium-metal chelate compound | Diarylamine compound | Reflectance (%) | Recording sensitivity (mW) | Reflectance (%) | Recording sensitivity (mW) |
| Ex. 8 | A-6 (25) | B-15 (75) | C-1 (10) | 49 | 7.5 | 48 | 7.6 |
| Ex. 9 | A-4 (25) | B-1 (75) | C-5 (15) | 50 | 7.6 | 48 | 7.6 |
| Ex. 10 | A-15 (40) | B-17 (60) | C-10 (1) | 49 | 7.9 | 50 | 8.2 |
| Com. Ex. 1 | A-9 (40) | B-4 (60) | — | 51 | 8.0 | 53 | 15.0 |

*The numerals in the parentheses are parts by weight.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An optical recording medium, comprising:

a substrate; and a recording layer deposited on or above the substrate, wherein the recording layer comprising:

at least one formazan-metal chelate compound comprising a formazan compound and a metal component;

at least one squarylium-metal chelate compound comprising a squarylium compound and a metal component; and at least one diarylamine compound.

2. The optical recording medium according to claim 1, wherein the formazan-metal chelate compound and the squarylium-metal chelate compound each have a maximum absorption in a range of a wavelength of 500 nm to 650 nm in absorption spectrum in terms of their films, and the diarylamine compound has a maximum absorption in a range of a wavelength of 650 nm to 800 nm in absorption spectrum in terms of its film.

3. The optical recording medium according to claim 1, wherein a weight ratio of the formazan-metal chelate compound to the squarylium-metal chelate compound in the recording layer is from 10:90 to 50:50.

4. The optical recording medium according to claim 1, wherein the diarylamine compound is contained in the recording layer in an amount of 0.5% by weight to 20% by weight to the total weight of the formazan-metal chelate compound and the squarylium-metal chelate compound.

5. The optical recording medium according to claim 1, wherein the diarylamine compound is contained in the recording layer in an amount of 1% by weight to 5% by weight to the total weight of the formazan-metal chelate compound and the squarylium-metal chelate compound.

6. The optical recording medium according to claim 1, wherein the formazan-metal chelate compound comprises one of formazan compounds represented by the following Formula (I) or (II), and one metal component:

(I)

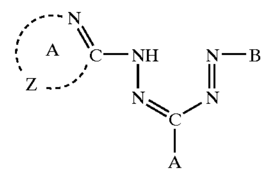

wherein "Ring A" is a substituted or unsubstituted nitrogen-containing five- or six-membered ring; "Z" is an atomic group constituting "Ring A," where "Ring A" may have another ring fused thereto; "A" is one selected from the group consisting of an alkyl group which may be substituted, an aryl group which may be substituted, an alkylcarbonyl group which may be substituted, an arylcarbonyl group which may be substituted, an alkenyl group which may be substituted, a heterocyclic group which may be substituted and an alkoxycarbonyl group which may be substituted; and "B" is one selected from the group consisting of an alkyl group which may be substituted, an alkenyl group which may be substituted and an aryl group which may be substituted;

(II)

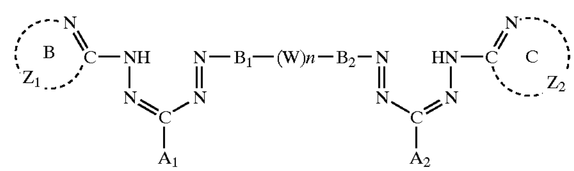

wherein "Ring B" and "Ring C" are the same or different and are independently a substituted or unsubstituted nitrogen-containing five- or six-membered ring; "$Z_1$" and "$Z_2$" are atomic groups constituting "Ring B" and "Ring C," respectively; each of "Ring B" and "Ring C" may have another ring fused thereto; "$A_1$" and "$A_2$" are independently one selected from the group consisting of an alkyl group which may be substituted, an aryl group which may be substituted, an alkylcarbonyl group which may be substituted, an arylcarbonyl group which may be substituted, an alkenyl group which may be substituted, a heterocyclic group which may be substituted and an alkoxycarbonyl group which may be substituted; "$B_1$" and "$B_2$" are independently one selected from the group consisting of an alkylene group which may be substituted, an alkenylene group which may be substituted and an arylene group which may be substituted; "W" is one of —$CH_2$— and —$SO_2$—; and "n" is an integer of 0 or 1.

7. The optical recording medium according to one of claims 1 and 6, wherein the metal component of the formazan-metal chelate compound is at least one selected from the group consisting of vanadium, manganese, iron, cobalt, nickel, copper, zinc, palladium, oxides thereof and halides thereof.

8. The optical recording medium according to claim 1, wherein the squarylium-metal chelate compound is a compound represented by the following Formula (III):

(III)

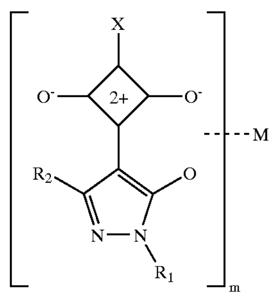

wherein "$R_1$" and "$R_2$" are the same or different and are independently one selected from the group consisting of a hydrogen atom, an aliphatic group which may be substituted, an aralkyl group which may be substituted, an aryl group which may be substituted and a heterocyclic group which may be substituted; "M" is a metal atom capable of coordination; "m" is an integer of 2 or 3 and; "X" is one selected from the group consisting of an aryl group which may be substituted, a heterocyclic group which may be substituted and $Z_3$=CH—, wherein "$Z_3$" is a heterocyclic group which may be substituted.

9. The optical recording medium according to claim 8, wherein "X" in Formula (III) is a group represented by the following Formula (IV):

(IV)

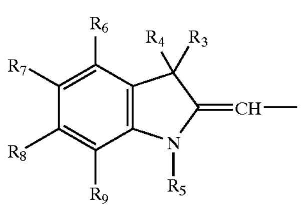

wherein "$R_3$" and "$R_4$" are the same or different and are independently an aliphatic group which may be substituted, or "$R_3$" and "$R_4$" are taken together with an adjacent carbon atom to form one of an alicyclic hydrocarbon ring and a heterocyclic ring; "$R_5$" is one selected from the group consisting of a hydrogen atom, an aliphatic group which may be substituted, an aralkyl group which may be substituted and an aryl group which may be substituted; and "$R_6$," "$R_7$," "$R_8$" and "$R_9$" are the same or different and are independently one selected from the group consisting of a hydrogen atom, a halogen atom, an aliphatic group which may be substituted, an aralkyl group which may be substituted, an aryl group which may be substituted, a nitro group, a cyano group and an alkoxy group which may be substituted, or adjacent two of "$R_6$," "$R_7$," "$R_8$" and "$R_9$" are taken together with two adjacent carbon atoms to form a ring which may be substituted.

10. The optical recording medium according to claim 8, wherein "M" in Formula (III) is aluminum.

11. The optical recording medium according to claim 1, wherein the diarylamine compound is a compound represented by the following Formula (V):

(V)

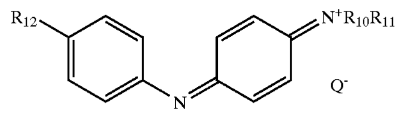

wherein "$R_{10}$" and "$R_{11}$" are the same or different and are independently one of a hydrogen atom and an alkyl group which may be substituted; "$R_{12}$" is one selected from the group consisting of a hydrogen atom, an alkyl group which may be substituted and an alkylamino group which may be substituted; and "$Q^-$" is an anion.

12. The optical recording medium according to claim 11, wherein the anion "$Q^-$" is one selected from the group consisting of I—, $ClO_4$—, $BF_4$—, $PF_6$— and $SbF_6$—.

13. The optical recording medium according to claim 11, wherein "$R_{10}$" and "$R_{11}$" are independently an alkyl group having 1 to 15 carbon atoms; and "$R_{12}$" is one of an alkyl group having 1 to 15 carbon atoms and an alkylamino group containing an alkyl group having 1 to 15 carbon atoms.

14. The optical recording medium according to claim 1, wherein the recording layer alone has a refractive index "n" of 1.5 to 3.0 and an extinction coefficient "k" of 0.02 to 0.3 with respect to radiation at a wavelength of a recording-reading wavelength ±5 nm.

15. The optical recording medium according to claim 1, further comprising a reflective layer on or above the substrate, wherein the reflective layer comprises at least one selected from the group consisting of gold, silver, copper, aluminum, and alloys thereof.

16. The optical recording medium according to claim 1, wherein the substrate has grooves at a track pitch of 0.7 μm to 0.8 μm and a groove width in terms of half width of 0.18 μm to 0.40 μm.

17. The optical recording medium according to claim 1, on which information can be recorded using radiation at a wavelength of 600 nm to 720 nm.

18. An optical recording method, comprising the step of recording information on an optical recording medium using radiation at a wavelength of 600 nm to 720 nm, the optical recording medium comprising:
- a substrate; and
- a recording layer deposited on or above the substrate, wherein the recording layer comprising:
- at least one formazan-metal chelate compound comprising a formazan compound and a metal component;
- at least one squarylium-metal chelate compound containing a squarylium compound and a metal component; and
- at least one diarylamine compound.

19. An optical recording device having an optical recording medium, the optical recording medium comprises:

a substrate; and a recording layer deposited on or above the substrate, wherein the recording layer comprises:
- at least one formazan-metal chelate compound comprising a formazan compound and a metal component;
- at least one squarylium-metal chelate compound comprising a squarylium compound and a metal component; and
- at least one diarylamine compound.

* * * * *